United States Patent
Thomas

(10) Patent No.: US 9,897,375 B2
(45) Date of Patent: Feb. 20, 2018

(54) CONTINUOUS FLOW DRYER FOR TREATING BULK MATERIAL

(71) Applicant: Michael R. Thomas, St. Clair, MI (US)

(72) Inventor: Michael R. Thomas, St. Clair, MI (US)

(73) Assignee: Nationwide 5, LLC, Ord, NE (US)

( * ) Notice: Subject to any disclaimer, the term of this patent is extended or adjusted under 35 U.S.C. 154(b) by 816 days.

(21) Appl. No.: 13/659,828

(22) Filed: Oct. 24, 2012

(65) Prior Publication Data
US 2014/0110320 A1 Apr. 24, 2014
US 2018/0003439 A9 Jan. 4, 2018

Related U.S. Application Data

(63) Continuation-in-part of application No. 13/652,393, filed on Oct. 15, 2012, now Pat. No. 8,652,555, which
(Continued)

(51) Int. Cl.
*A23P 10/25* (2016.01)
*F26B 5/14* (2006.01)
(Continued)

(52) U.S. Cl.
CPC ...... *F26B 5/14* (2013.01); *A23L 7/17* (2016.08); *A23P 10/25* (2016.08); *A23P 10/28* (2016.08);
(Continued)

(58) Field of Classification Search
CPC .. A23P 1/02; A23P 1/025; A23P 1/027; A23P 1/12; A23P 1/125; B29C 47/92; B29C 2947/92019; B29C 2947/92209; B29C 2947/926; B29C 2947/92704; B29C 47/38; B29C 47/402; B29C 47/20; B29C 47/30; B29C 47/60; B29C 47/0016; B29C 47/8815; B29C 2947/92723; B29C 2947/92428; B29C 2947/92923;
(Continued)

(56) References Cited

U.S. PATENT DOCUMENTS 3,458,321 A * 7/1969 Stephenson ............. A23P 30/20
366/145
3,904,769 A * 9/1975 Sair ........................ A23J 3/26
425/144
(Continued)

*Primary Examiner* — Seyed Masoud Malekzadeh
(74) *Attorney, Agent, or Firm* — Doster Greene, LLC

(57) ABSTRACT

A continuous flow dryer system according to various embodiments can include a source for supplying a material to be treated having a high moisture content, such as a distiller wet grain, a profile screw compression dryer, a profile screw, and a drive coupled to the profile screw for axially rotating the profile screw. The profile screw compression dryer includes an inlet for receiving the material for drying, which is fed therein in a controlled manner. The profile screw is provided within the housing of the dryer. The profile screw has a diameter that increases in dimension in a direction away from the inlet for increasing the compressive force applied to the material to assist with drying as the profile screw rotates and moves the material longitudinally along the profile screw to produce a final product, for example, a distiller dried grain for use as an animal feed.

15 Claims, 19 Drawing Sheets

Related U.S. Application Data is a continuation of application No. 13/448,358, filed on Apr. 16, 212, now Pat. No. 8,287,268.

(60) Provisional application No. 61/476,224, filed on Apr. 15, 2011.

(51) Int. Cl.

| | | |
|---|---|---|
| *A23P 10/28* | (2016.01) | |
| *A23P 30/20* | (2016.01) | |
| *A23P 30/25* | (2016.01) | |
| *A23L 7/17* | (2016.01) | |
| B29C 47/00 | (2006.01) | |
| B29C 47/40 | (2006.01) | |
| B29C 47/20 | (2006.01) | |
| B29C 47/92 | (2006.01) | |
| B29C 47/60 | (2006.01) | |
| B29C 47/30 | (2006.01) | |
| B29C 47/38 | (2006.01) | |
| B29C 47/88 | (2006.01) | |
| A23P 10/20 | (2016.01) | |

(52) U.S. Cl.
CPC .............. *A23P 30/20* (2016.08); *A23P 30/25* (2016.08); *A23P 10/20* (2016.08); *B29C 47/0016* (2013.01); *B29C 47/20* (2013.01); *B29C 47/30* (2013.01); *B29C 47/38* (2013.01); *B29C 47/402* (2013.01); *B29C 47/60* (2013.01); *B29C 47/8815* (2013.01); *B29C 47/92* (2013.01); *B29C 2947/92* (2013.01); *B29C 2947/926* (2013.01); *B29C 2947/92019* (2013.01); *B29C 2947/92209* (2013.01); *B29C 2947/92428* (2013.01); *B29C 2947/92704* (2013.01); *B29C 2947/92923* (2013.01)

(58) Field of Classification Search
CPC .. B29C 2947/92; A23L 1/0076; A23L 1/1805; A23L 1/0023; A23K 1/003; F26B 7/00
USPC ....... 425/143, 144, 145, 149, 207, 208, 209, 425/378.1, 382.4, 404, 379.1, 382 R; 426/454, 512, 516, 518; 210/137, 145, 210/149, 179
See application file for complete search history.

(56) References Cited

U.S. PATENT DOCUMENTS

| | | | | |
|---|---|---|---|---|
| 4,118,163 | A * | 10/1978 | Lee .................... | B29C 47/60 366/169.1 |
| 4,118,164 | A * | 10/1978 | Wenger ............... | A23J 3/26 366/79 |
| 4,125,635 | A * | 11/1978 | de Ruyter ............ | A23J 3/26 264/202 |
| 4,409,165 | A * | 10/1983 | Kim .................... | B29C 44/3442 264/211.23 |
| 4,716,000 | A * | 12/1987 | Kerschbaum ....... | B29B 13/00 264/171.15 |
| 5,456,870 | A * | 10/1995 | Bulgrin ............... | B29C 45/78 264/211.21 |
| 5,798,077 | A * | 8/1998 | Womer ............... | B29C 47/6081 264/176.1 |
| 6,017,145 | A * | 1/2000 | Jenkins ............... | B29C 47/60 366/79 |
| 6,228,308 | B1 * | 5/2001 | Uehara ............... | B29B 7/429 264/328.17 |
| 6,247,836 | B1 * | 6/2001 | Nakajima ........... | B29C 47/60 366/88 |
| 6,328,919 | B1 * | 12/2001 | Pham ................. | B29C 47/367 264/177.1 |
| 7,008,202 | B2 * | 3/2006 | Teraoka ............. | B29C 44/3446 264/50 |
| 7,611,347 | B1 * | 11/2009 | Kearns ............... | A23N 17/005 425/205 |
| 7,654,813 | B1 * | 2/2010 | Kearns ............... | A23N 17/005 425/208 |
| 8,287,268 | B1 * | 10/2012 | Thomas .............. | A23P 1/027 425/144 |
| 2003/0075833 | A1 * | 4/2003 | Thomson ........... | B29C 45/1645 264/328.17 |
| 2004/0080064 | A1 * | 4/2004 | MacPhee ............ | B29C 47/54 264/40.1 |
| 2006/0034958 | A1 * | 2/2006 | Schlummer ........ | B29C 44/3446 425/4 C |
| 2006/0113695 | A1 * | 6/2006 | De Maria .......... | B29B 7/905 264/102 |
| 2008/0125612 | A1 * | 5/2008 | Bruckmayer ...... | B04B 1/20 568/840 |

* cited by examiner

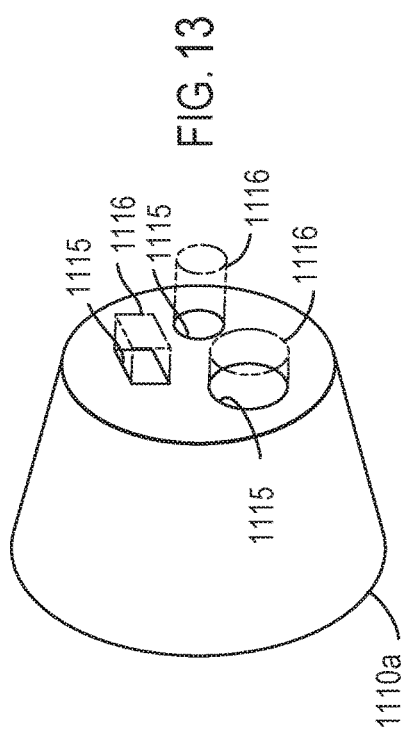
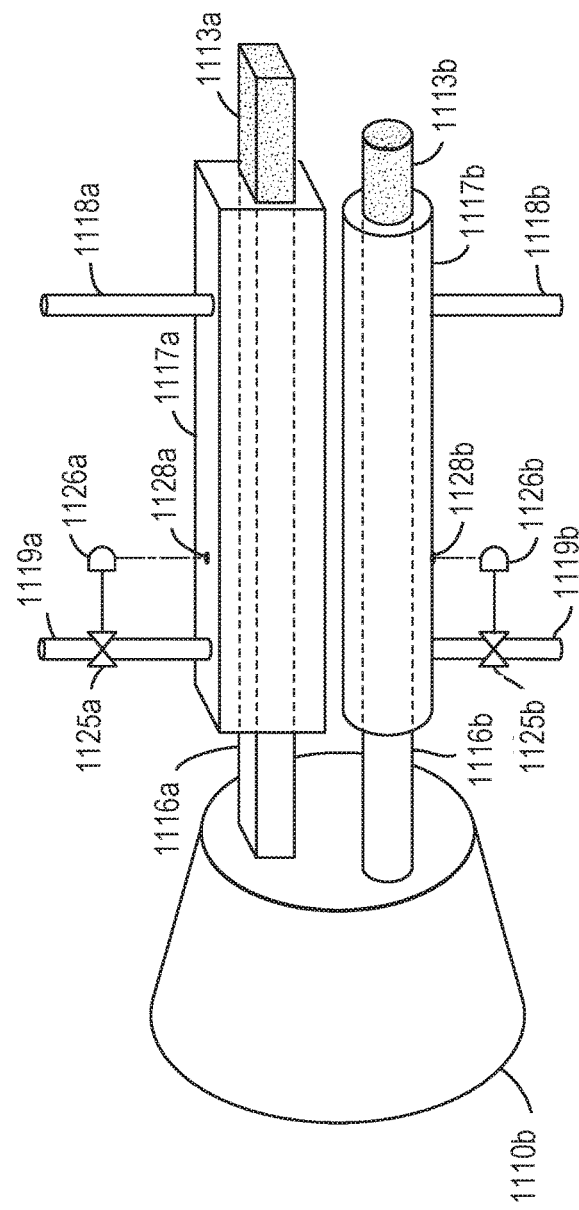
FIG. 13
FIG. 14

CONTINUOUS FLOW DRYER FOR TREATING BULK MATERIAL

REFERENCE TO RELATED APPLICATION

This application is a continuation-in-part of U.S. application Ser. No. 13/652,393, filed Oct. 15, 2012, and now U.S. Pat. No. 8,652,555, which claims priority of U.S. application Ser. No. 13/448,358, filed Apr. 16, 2012, and now U.S. Pat. No. 8,287,268, which claims priority of U.S. Provisional Patent Application Ser. No. 61/476,224, which was filed on Apr. 15, 2011. The subject matter of the earlier filed application is hereby incorporated by reference.

FIELD

The present teachings relate to devices and methods for continuously drying and/or distilling bulk materials, such as, for example, distiller wet grain (DWG), sludge, slurry and the like conveyed and compressed by means of a profile screw extruder. The device is also capable of performing continuous flow distillation of gases and vapors contained in certain treated materials.

INTRODUCTION

Distiller wet grains (DWG) are one of the residual products of grain fermentation that forms during the production of ethanol. This residue which is sometimes called "mash" has high nutritional value and has been adopted by livestock farmers as a supplemental food source. However there is a major problem with wet distiller grains in that it contains organic solids and has a moisture content of about 60-70% which causes it to be susceptible to mold and mildew when exposed to air for approximately 4 to 5 days. This potential mold and mildew issue makes it imperative that the wet grains be used and consumed relatively quickly since extended storage of wet grains is not feasible. To address the mold and mildew issues with wet grains, a drying process is applied to the wet grains prior to their delivery as livestock feed. Typically, the wet grains are treated in rotating drying drums where combustion gases are heated to approximately 900° F. and then injected into the wet grains to evaporate the excess moisture. At the conclusion of the drying process, the wet grains are transformed into dried distiller grains having moisture content in the range of 10 to 15% water. The dried grains are a more desirable livestock feed in that they are not as susceptible to mold or mildew given its lower moisture content. Along with the concern that the DWG is susceptible to mold and mildew, transporting and delivery of this wet bulky material presents difficulties in handling that makes it a very difficult to integrate this product into a livestock feed program.

However, one of the major concerns is the risk of explosions associated with the conventional drying process that transforms distiller wet grain into distiller dry grain. Given that the drying process generally takes place in a rotating drum with an open boundary between the grain and the heated combustion gases, there is a constant danger of potential explosions within the volatile atmosphere inside the drying drum. This operating danger can result in a major safety issue for personnel operating the dryers and it could cause down time and increased capital cost. Because of the relatively high temperature of the drying gases, there is also the potential loss in nutritional value of the treated distiller grain given that it is exposed to these potentially damaging gases. It is also very common to dry the distiller wet grain in a rotating drum that is arranged for batch processing. Because of the loading and unloading of the treated grain in a batch process, material handling issues and processing delays add to the inherent inefficiency of this process.

In the production workflow of producing a final product of distiller dried grain (DDG) from distiller wet grain (DWG), the cost of energy to dry the DWG and the cost to transport the DDG to its destination of use are major financial considerations. At present, the DWG is produced as a fermentation byproduct from the production of ethanol. At the ethanol production plant, some of the DWG is shipped immediately directly to customers such as livestock farms or secondary treatment facilities that are located near the ethanol plant. This travel restriction is necessary since the DWG cannot withstand long distance shipping due to its susceptibility to mold and mildew beyond a few days. The shipping of the DWG presents some special handling issues because of it high moisture content (70-80%) and its potential to contaminate the shipping containers due to the DWG mold and mildew concerns. It is also important to note that, given the high moisture content of the DWG, a substantial part of the shipping cost is associated with the cost to ship the weight of the moisture in the product compared to the actual grain product itself.

If the ethanol plant includes a drying facility, it may dry the DWG to become the DDG which may solve some of the handling and potential contamination issues. This drying process however does not come without substantial cost. As pointed out previously, combustion gas dryers are used to dry the DWG and the cost of the gas to accomplish this can amount to a substantial part of the total energy cost to operate the ethanol production plant. Also, the high temperature drying process degrades the nutritional value of the treated grain, which results in a lost in the feed nutritional value.

While the DDG is in many ways a much more desirable product than the DWG, it has been found that further treatment of the DDG to form it into a concentrated pellet product provides an even more desirable product given its higher nutritional value per unit volume and its ease of handling compared to the granular consistency of untreated DDG. In some conventional approaches, the pelletized DDG, however, requires additional transportation costs. Initially, the granular DDG is shipped from a drying facility such as an ethanol plant. Then, it is shipped to a facility that processes the granular DDG into a pelletized DDG final product. The final product is then ship to a customer for retail or to a point of use such as a livestock farm.

It may be desirable to provide a low temperature drying facility that is located at the point of production of the DWG such as an ethanol plant that is arranged to process the DWG directly into a final pelletized DDG product which eliminates many of the workflow costs associated with conventional processes.

SUMMARY

The present invention may satisfy one or more of the above-mentioned desirable features. Other features and/or advantages may become apparent from the description which follows.

An apparatus and method configured to dry wet bulk material in a continuous flow dryer where a profile screw extruder conveys and compresses the material during the drying process.

An apparatus and method is provided to reduce production costs and hazards by drying distiller grain in a low temperature process in a profile screw dryer without the application of high temperature combustion gases.

An apparatus and method is provided to reduce production cost of a final pelletized DDG product by directly converting the DWG to DDG pellets in one continuous flow process.

An apparatus and method is provided to increase the efficiency of drying bulk material by providing an energy reclamation system and drying air recirculation system in a profile screw dryer.

A continuous flow distillation system is provided that can be arranged to collect and condense vapors and gases having different boiling point in separate collection vessels.

An apparatus is provided that is convertible between a drying system and a distillation system.

An apparatus and method is provided that can transform a material which has moisture content in the range of approximately 60-75% moisture into an intermediate product or final product that has moisture content in the range of approximately 0-15% moisture without direct exposure to combustion drying gases.

An apparatus and method that produces high protein feed without the addition of additives.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

The skilled artisan will understand that the drawings described below are for illustrative purposes only. The drawings are not intended to limit the scope of the present teachings in any way.

FIG. 13 shows an alternative embodiment of FIG. 12 where the conical shaped enclosure feeds multiple extrusion die extremity tubes;

FIG. 14 shows a compression enclosure where multiple distiller grain die extremities have separately adjustable cooling heat exchangers for the individual die extremities;

DETAILED DESCRIPTION OF VARIOUS EMBODIMENTS

Reference will now be made to various embodiments, examples of which are illustrated in the accompanying drawings. However, these various exemplary embodiments are not intended to limit the disclosure. On the contrary, the disclosure is intended to cover alternatives, modifications, and equivalents.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise. Therefore, the terms "a," "an" and "at least one" are used interchangeably in this application. Unless otherwise indicated, all numbers expressing quantities, percentages or proportions, and other numerical values used in the specification and claims, are to be understood as being modified in all instances by the term "about."

Figure 1:
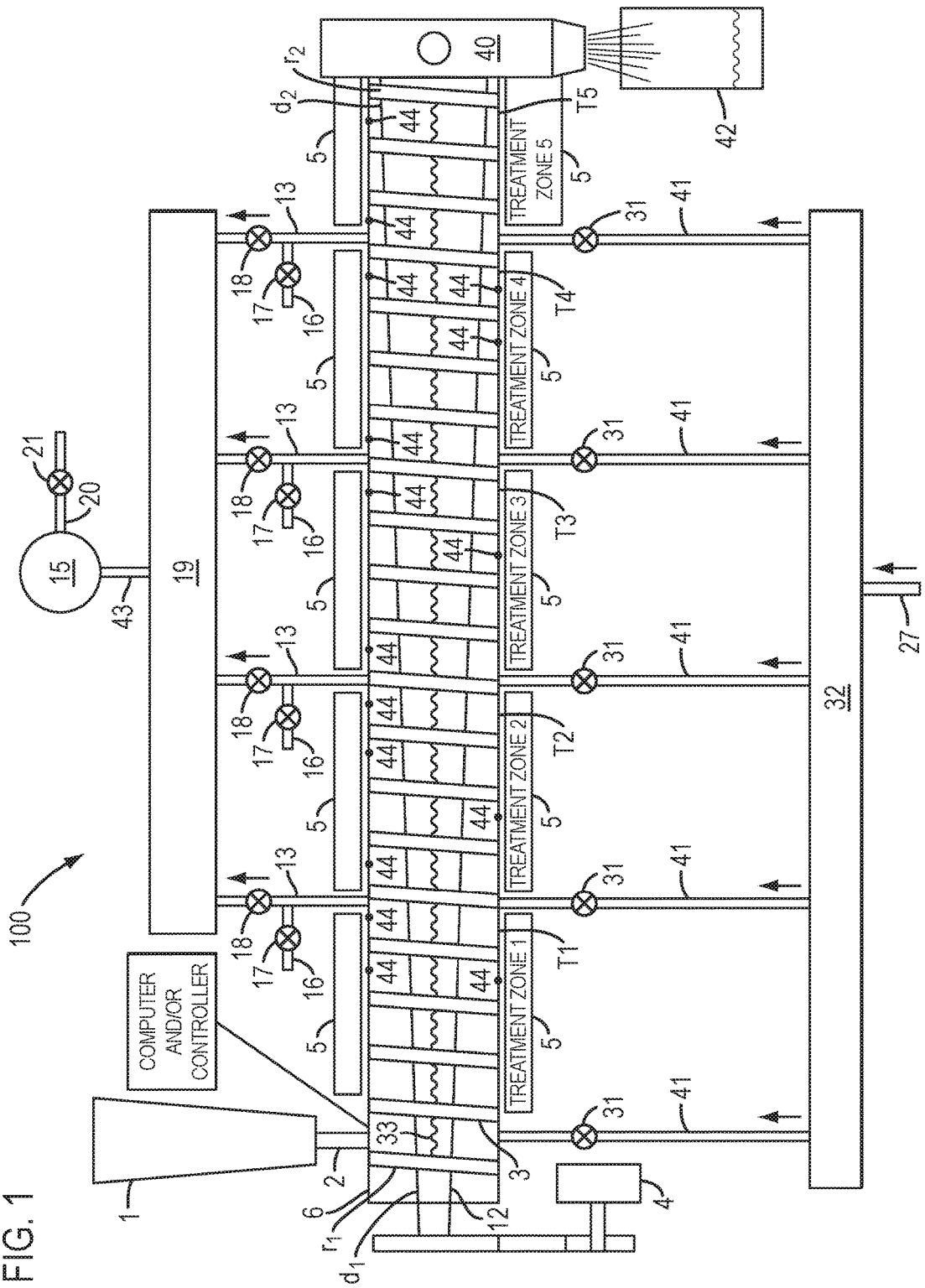
FIG. 1 is a schematic drawing of a continuous flow drying apparatus for bulk material where a profile extruder screw conveys and compresses the material as it passes through a plurality of treatment zones.
Figure 1A:
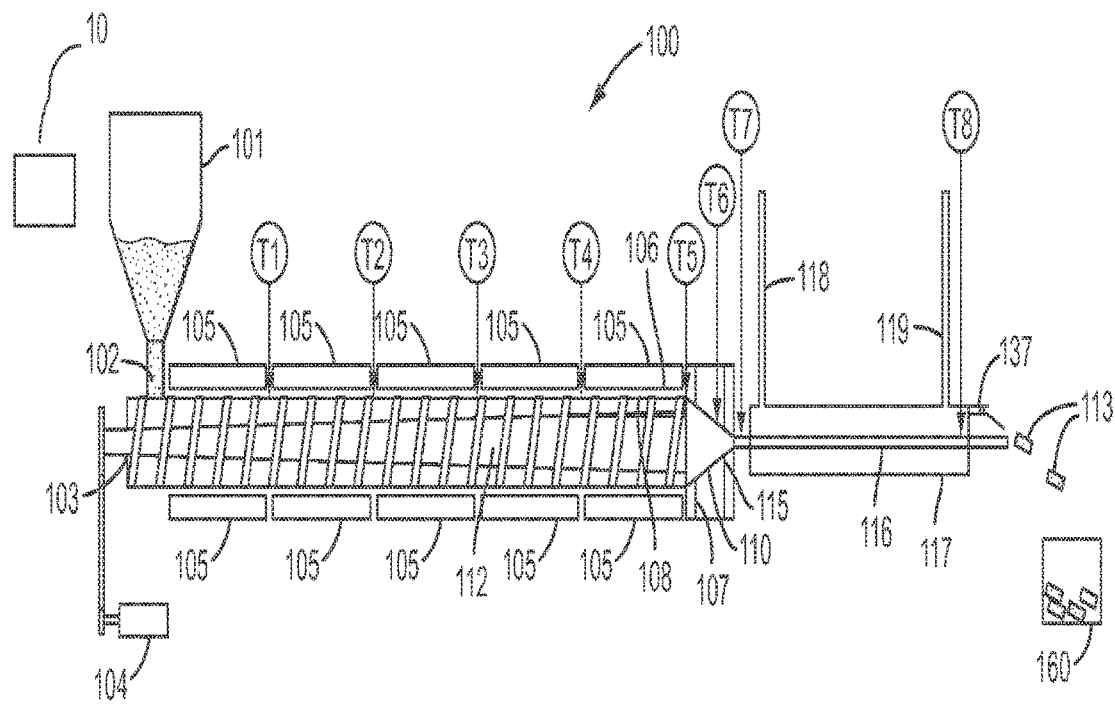
Figure 1B:
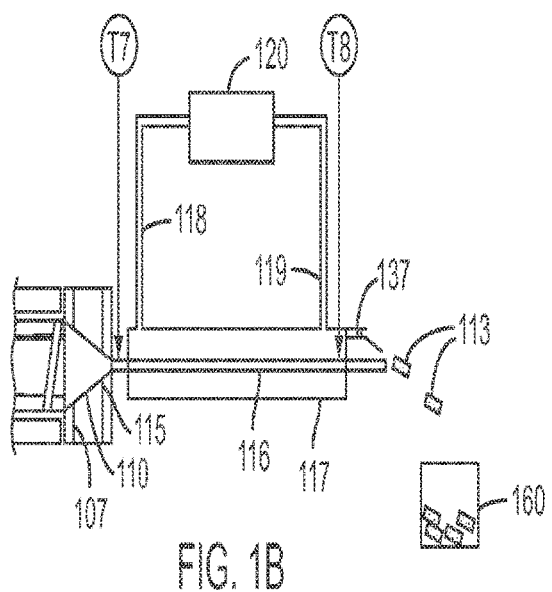

An exemplary embodiment of the continuous flow drying apparatus 100 that can be used, for example, to treat bulk material, which may include, for example, distiller wet grain (DWG), sludge, slurry and the like, is illustrated in FIG. 1.

Figure 2A:
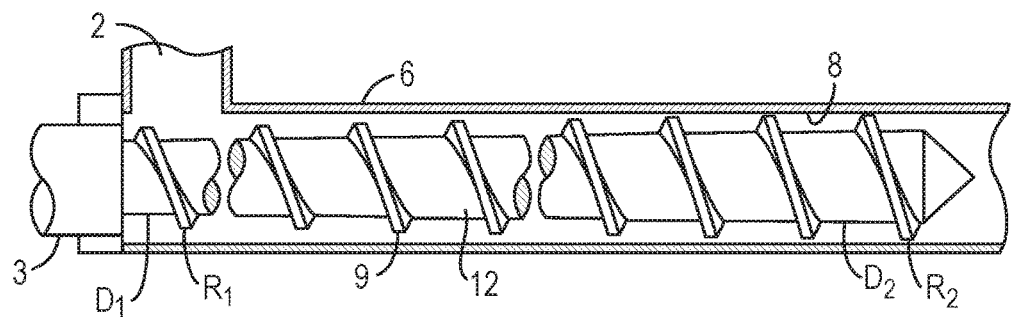
FIG. 2A is a side view of the general shape of the profile screw extruder used in dryer apparatus of FIG. 1.
Figure 2B:
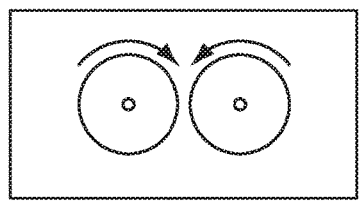
FIG. 2B is another exemplary embodiment of two parallel profile screw extruders rotating counter towards each.
Figure 2C:
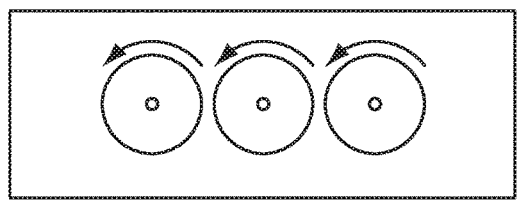
FIG. 2C is another exemplary embodiment of three parallel profile screw extruders rotating in the same direction.

FIG. 1 illustrates a schematic diagram of the basic profile screw dryer where wet bulk material is processed into dried final product. The apparatus 100 can provide a loading zone for example, a hopper 1, for loading the bulk material into the apparatus 100. Material supplied from hopper 1 in loose granular form is fed into the inlet chute 2 of the of the profile screw extruder 12. The general shape of the profile of screw is shown in FIG. 2A. The profile radius of the screw decreases from $r_1$ to $r_2$ (FIG. 2A) and, as a result, the shaft diameter increases from $d_1$ to $d_2$ along the length of the screw which creates an increasing compression force on the material being treated and conveyed downward due to the rotation of the screw. Beginning at the inlet chute 2, the radius $r_1$ may be substantially larger than the shaft diameter $d_1$, such as for example, having a radius $r_1$ greater than twice the size of diameter $d_1$. Conversely, the shaft diameter $d_2$ may be increased longitudinally to be substantially larger than the radius $r_2$, at the terminal end 40, such as for example, having a diameter $d_2$ greater than twice the size of radius r2. Those having skill in the art would understand, however, that other profile screw arrangements having multiple screws can be used to convey and compress the treated material. For example, in lieu of or in addition to the single screw in FIG. 2A, compound rotating screws can be employed having screw elements that rotate in a counter rotating direction as shown in FIG. 2B or in the same direction as shown in the FIG. 2C. In the embodiments employing multiple screws, the treated material may be fed into the inlet of the housing thereby entraining the treated material between the rotating screws and then moving the treated material downward and out of the housing, as the screws rotate.

As illustrated in FIG. 1, the screw of the extruder can be driven by a variable speed motor 4 that drives the screw element 3 of the profile screw extruder 12. The wet bulk material entering the profile screw extruder at chute 2 may have a moisture content in the range of about 70-80% by weight. As the material is conveyed downward within the profile screw extruder 12, heat is added to the material by one or more heaters 5 along the wall 6 of the profile screw extruder. In the embodiments employing more than one heater, such as the example in FIG. 1, the heaters 5 can be arranged in a plurality of treatment zones where the individual heaters can be equipped with independent heater controls for creating separate treatment zones where desired temperatures are maintained in the treated material as it is conveyed down the profile extruder 12. While five heaters zones are shown in FIG. 1, the number of actual heater zones employed could be greater or less than the five shown depending on the heating requirements of the treated material and the design requirements of a particular system. The heater device can be, for example, electric heaters, combustion gas heaters, microwave heaters, solar powered heaters or any combination of these or any other suitable heating devices.

A venting line 13 is provided between each treatment zone. One end of the vent line 13 connects to an end of a treatment zone and the second end of vent line 13 connects to a vacuum pump manifold 19. The manifold 19 connects to a vacuum pump 15 through line 43. An exhaust line 16 is provided, between the inlet of the vacuum pump manifold 19 and the first end of vent line 13, to vent vapor and gases from the treatment zones when it is not desirable to vent the treatment zones through the vacuum pump manifold. When the decision is made to exhaust the treatment zones via the exhaust line 16, valve 18 at the inlet to vacuum pump manifold 19 will be closed and valve 17 will be opened. The vacuum manifold 19 connects to the second ends of vent tubes 13 where each zone can be arranged to selectively have vacuum applied to a treatment zone or each treatment zone can be individually vented through lines 16 under the control of valves 17.

During the drying operation, the temperature maintained in the treatment zones can be controlled in each successive treatment zone to evaporate the liquid contained in the treated material. The required temperature to be maintained in each of the treatment zones of the dryer will depend on the material being dried and the boiling temperature of the material being treated. For example, when water is the liquid targeted to be evaporated from the treated material the temperature in the treatment zone needs to be at least 212° F. at atmosphere pressure of 14.7 psi. Should a vacuum be introduced in the treatment zone, the evaporation temperature of water will be less than 212° F. In the case of drying distiller wet grain (DWG) the evaporation of the liquid component may produce condensed dissolved solids (CDS) which is a very beneficial nutritional component that may be added to the final distiller dried grain (DDG) product. The dryer system 100 shown can be arranged, in some embodiments, to terminate all vacuum and venting to the treatment zones while only heating is applied to the material. Any vapor generated in the treatment zones under this mode of operation is exhausted through the terminal end 40 of the profile extruder.

Figure 3:
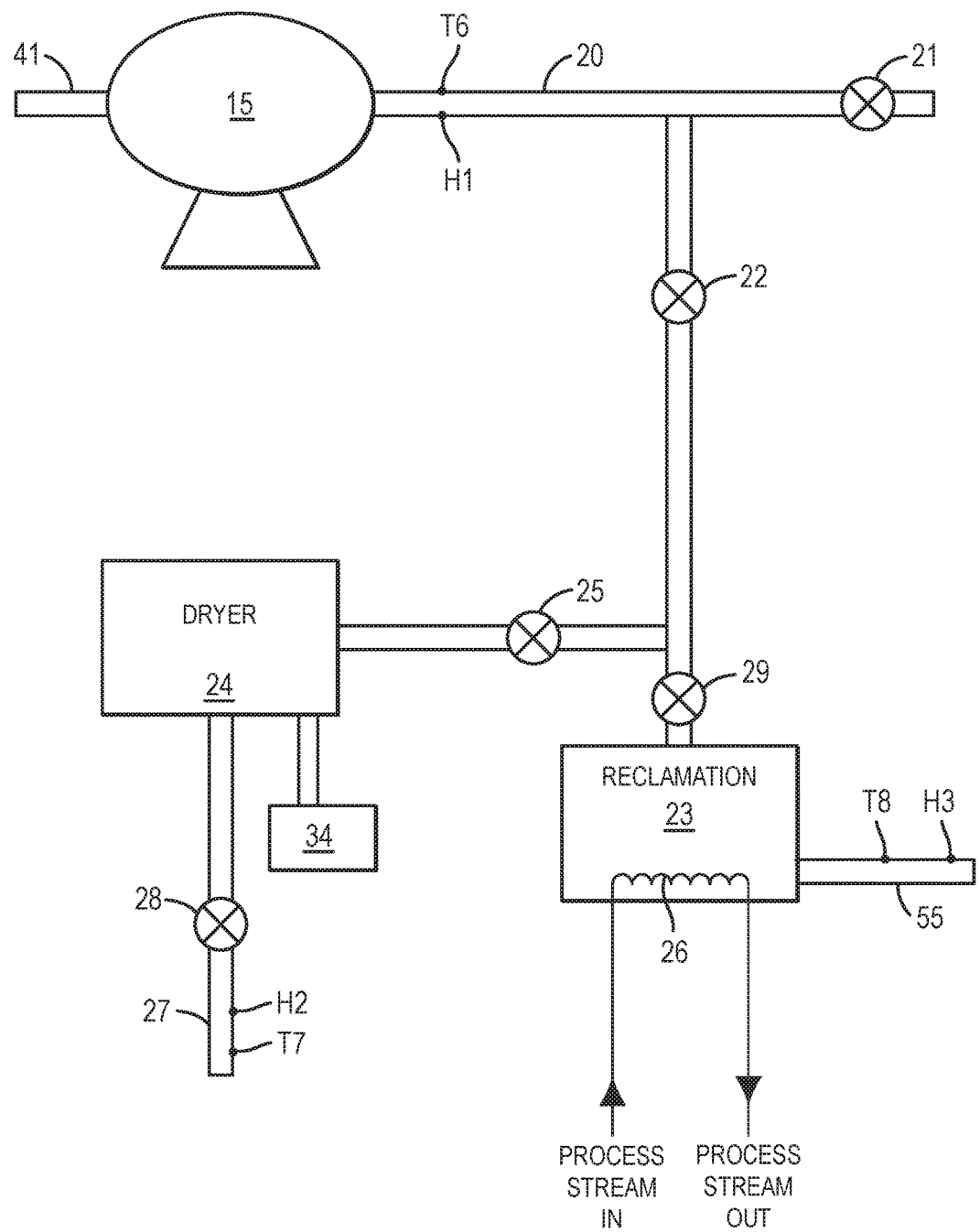
FIG. 3 is a schematic drawing of the details of the gas handling system for the continuous flow dryer of FIG. 1 including a drying air recirculation system and an energy reclamation system.

FIG. 3 illustrates an embodiment of the device including a drying air recirculation system 24 and an energy reclamation system 23. FIG. 3 shows a vapor and gas handling system where the exhaust gas and vapors entering vacuum pump 15 from line 43 may be vented to ambient through line 20 and valve 21. Given that the gases and vapors drawn out of the profile screw extruded at each successive treatments zone have been supplied with a considerable amount of heat by the heaters 5, it may be beneficial to the overall efficiency of the drying process if some of the heat in these exhaust gases is reapplied to the drying process. Optionally, these gases may be utilized to further enhance the overall efficiency of the drying system by drying and recirculating exhaust gases from the vacuum pump 15 to the treatment zones or using the exhaust gases in an energy reclamation system. In such embodiments, to utilize the exhaust gas drying and recirculation system 24, valves 21 and 29 are closed or throttled and valves 22 and 29 are opened permitting exhaust gases and vapors discharged from vacuum pump 15 to be directed to the recirculating air drying system 24. To utilize the energy reclamation system 23, valves 21 and 25 are closed and valve 29 is opened permitting exhaust gases to be directed to energy reclamation device 23. To simultaneously utilize both the recirculation exhaust gas drying system and the energy reclamation systems valves 22, 25 and 29 are opened and valve 21 is closed or throttled.

When the closed circuit dryer, in FIG. 3, is in operation, exhaust gases from vacuum pump 15 can be directed to the dryer 24 where they are treated to remove moisture from these gases. Some examples of the dehumidification apparatus that can be used are: separation tanks that use baffles to trap moisture in a collection tank, refrigeration cycle dehumidification apparatus that condenses out moisture by way of a cooled evaporator or the exhaust gases could be circulated through a heat exchanger that is cooled by cool air from outside during cool weather to condense the moisture out of the gases. These are just some examples of how the exhaust gases can be dried. Other methods can be applied according to the availability and cost of operation of those methods. The moisture removed from the dryer 24 can be collected as a liquid in receptacle 34 where it can be reused in the drying process or further treated if the collected liquid has some commercial value. In the case of drying the DWG, this collected liquid may be processed to collect, for example, remnant ethanol or corn oil. After the gases leave the dryer 24, they can be sent through valve 28 and line 27 to a recirculation manifold 32 (FIG. 1) and then thru supply line 41 back into the treatment zones that surround the profile extruder 12. Valves 31 regulate the recirculation flow through line 41 as desired. While the recirculation line is shown entering the treatment zone from the bottom it is understood that this recirculation air flow can be arranged to enter the treatment zone from the top, the side or any other position that would optimize the overall efficiency of the drying process.

In the embodiments where the energy reclamation system 23 in FIG. 3 is operational, exhaust gases from vacuum pump 15 pass through valve 29 and flow into the reclamation device 23 to transfer heat to a process stream heat exchanger 26. This process stream can be provided from any process that would benefit from the added heat gained as a result of heat exchange with the vacuum pump exhaust gases. Some examples of how heat reclaimed from the vacuum exhaust gases can be utilized include:

- To preheat the material to be dried prior to it entering the profile extruder treatment zones
- If the dryer is located onsite of an ethanol plant, then the reclamation heater can be used to supply heat to assist in the production of condensed dissolved solids (CDS)
- The reclamation heat can be used for space heating within the operating plant
- The reclaimed heat can also be used to heat/preheat hot water for use in the plant A line 55 discharges gases and vapors as they leave the reclamation system. The gases leaving line 55 can be directed back to the treatment zones by a connection through line 27 if they have the sufficient temperature and low humidity to contribute to the material drying process.

In FIG. 1, a series of temperature sensors T1, T2, T3, T4 and T5 can be embedded within the wall 6 of the profile screw extruder 12. These temperature sensors are used to monitor the temperature of the treated material so that appropriate adjustments to the heater output, material feeding rate, and profile screw rotation rate can be regulated to maintain the treated material within a desired temperature range as it moves downward along the treatment zones of the profile screw extruder 12. While five temperature sensors are shown in the treatment zones, there could be more temperature sensors or less temperature sensors depending on the material treated the length of the profile screw extruder and the desired precision of temperature monitoring within the heating and treatment zone. Other temperature sensors, such as T6, T7 and T8 shown in FIG. 3, can be provided to measure the temperature of the gases exhausted from the vacuum pump 15, the temperature of the gases exiting air dryer 24 and the temperature of the gases exiting the energy reclamation system, respectively. These temperature measurements can assist in determining how the exhaust gases may be reused in the drying process. It may also be beneficial to measure the humidity using humidity sensors, H1, H2 and H3 of the exhaust gases to also determine their energy content. It should be noted that the temperature sensors and humidity sensors can be connected in a computer control loop where individual heater output regulators, the profile screw extruder motor speed regulator, and the distiller grain feed flow controller can all be individually or jointly controlled to maintain preselected temperature conditions in the treated material along the profile screw extruder 12. Optionally, the profile screw 12 can be provided with an internal heating device 33 that can also supply heat to the material in the treatment zones. The profile screw heater 33 can be powered electrically or by the same means as provided for the heaters 5 in the zones. The profile screw can also be arranged for heating along selective sections of the screw at selective treatment zones and the control of the heating could be included in a computer loop control 400 within the treatment zones or it could have its own separate control system 400. In some embodiments, the housing 6 may include predetermined exposed portion that are open or exposed to the environment to vent off the steam collected therein.

During operation of the dryer system, the high moisture content bulk material is fed into the dryer by micromanaging the material to extract the moisture content. The material is fed into the dryer and spread in a thin layer along the screw, approximately 0.5-5 inches. As the screw rotates, the treated material advances down the screw passes through several heating zones. As discussed above, the ratio of the radius of the profile varies inversely to the diameter of the shaft. Thus, as the treated material advances down the screw, it will be subjected to an increasing compressive force due to the increase in the diameter, which will further facilitate drying the material.

Figure 4:
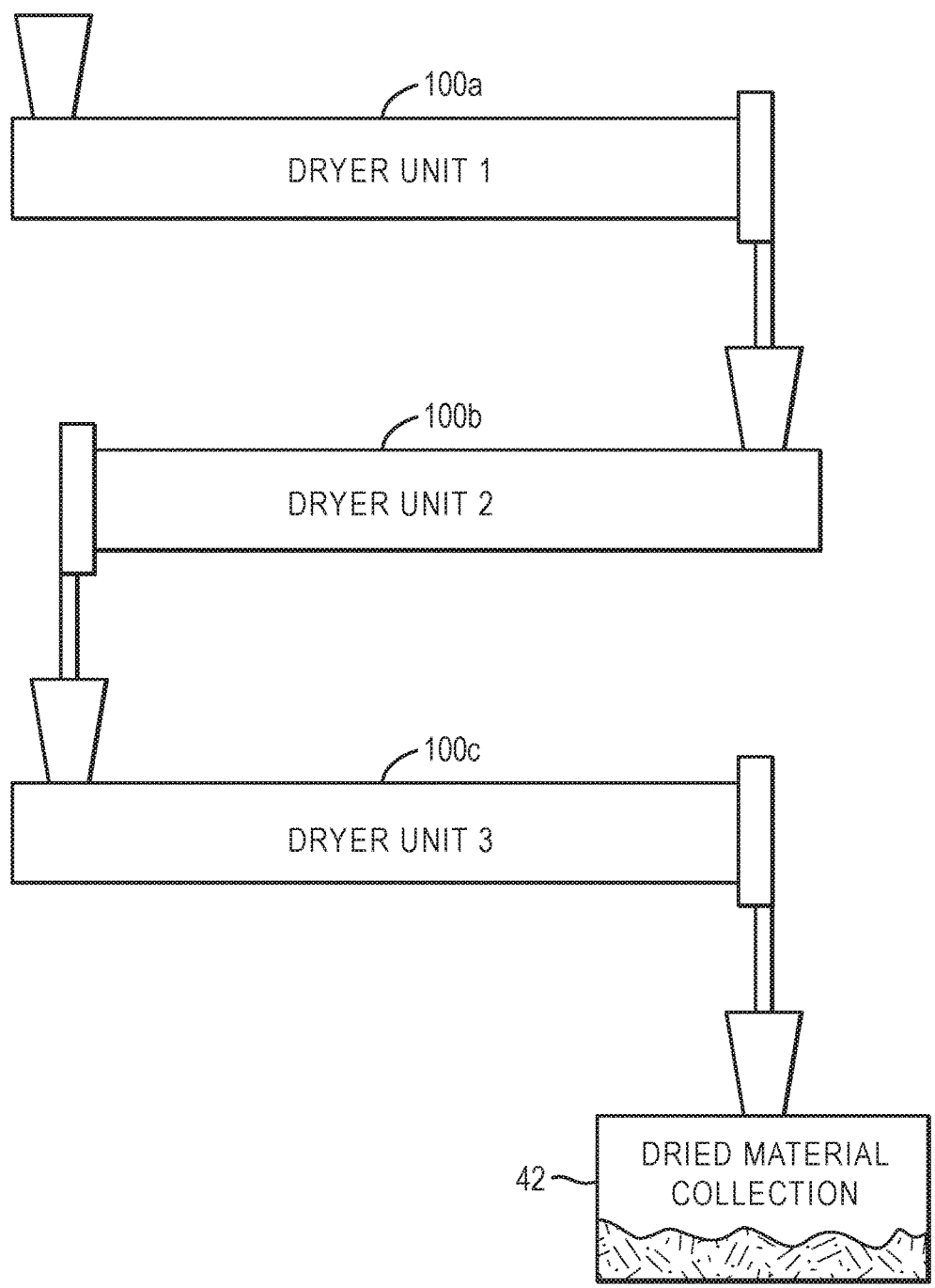
FIG. 4 is a schematic drawing of a plurality of continuous dyers as shown in FIG. 1 arranged in serial flow arrangement.
Figure 5:
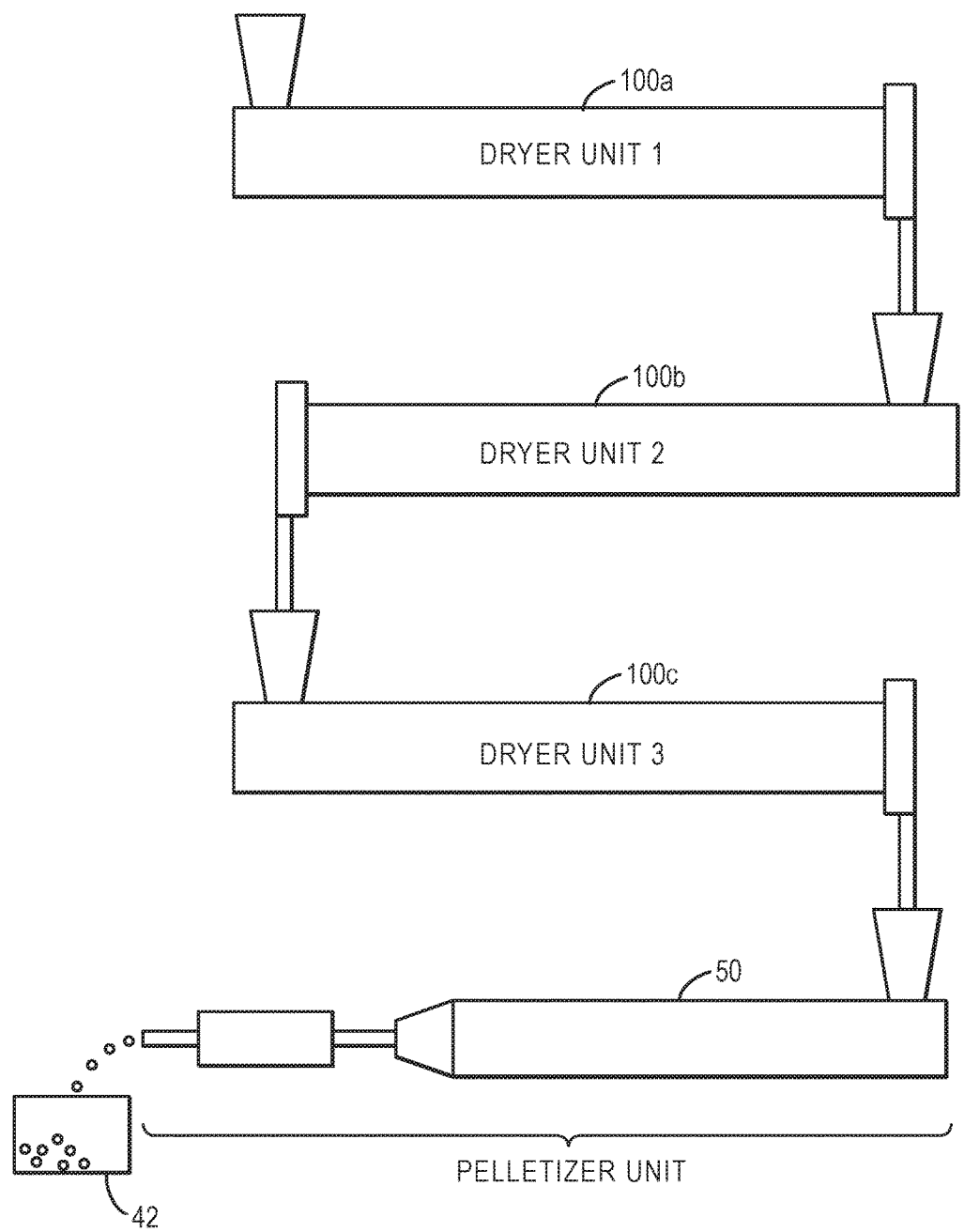
FIG. 5 is a schematic drawing of a plurality of continuous flow dryers as shown in FIG. 1 arranged in serial flow feeding a pelletizer production unit.

The profile screw dryer 100 shown in FIGS. 1-3 discloses an exemplary single stage drying unit that can be constructed to any length that is suitable for a particular drying application. It is however possible to design a drying system that can include multiple profile screw drying units arranged in series or parallel flow or a combination of both serial and parallel flow configurations. Some of the possible multi-dryer unit arrangements are shown, for example, in FIGS. 4-6. Each multi-dryer unit in FIGS. 4-6 can be arranged according to FIGS. 1-3. In FIG. 4, a plurality of continuous dryers is shown arranged in a serial flow arrangement. The example in FIG. 4 depicts three dryer units designated as Unit 1 (100a), Unit 2 (100b) and Unit 3 (100c) arranged in a serial flow treatment arrangement where wet bulk material is transformed into a dried granular final product that is collected in a storage or shipping bin 42. In FIG. 5, three profile screw dryer units are shown where the three serial flow dryers 100a, 100b, 100c supply dried material to final product pellet producing unit 50 at the end of the production line and collected in a storage or shipping bin 42.

Figure 6:
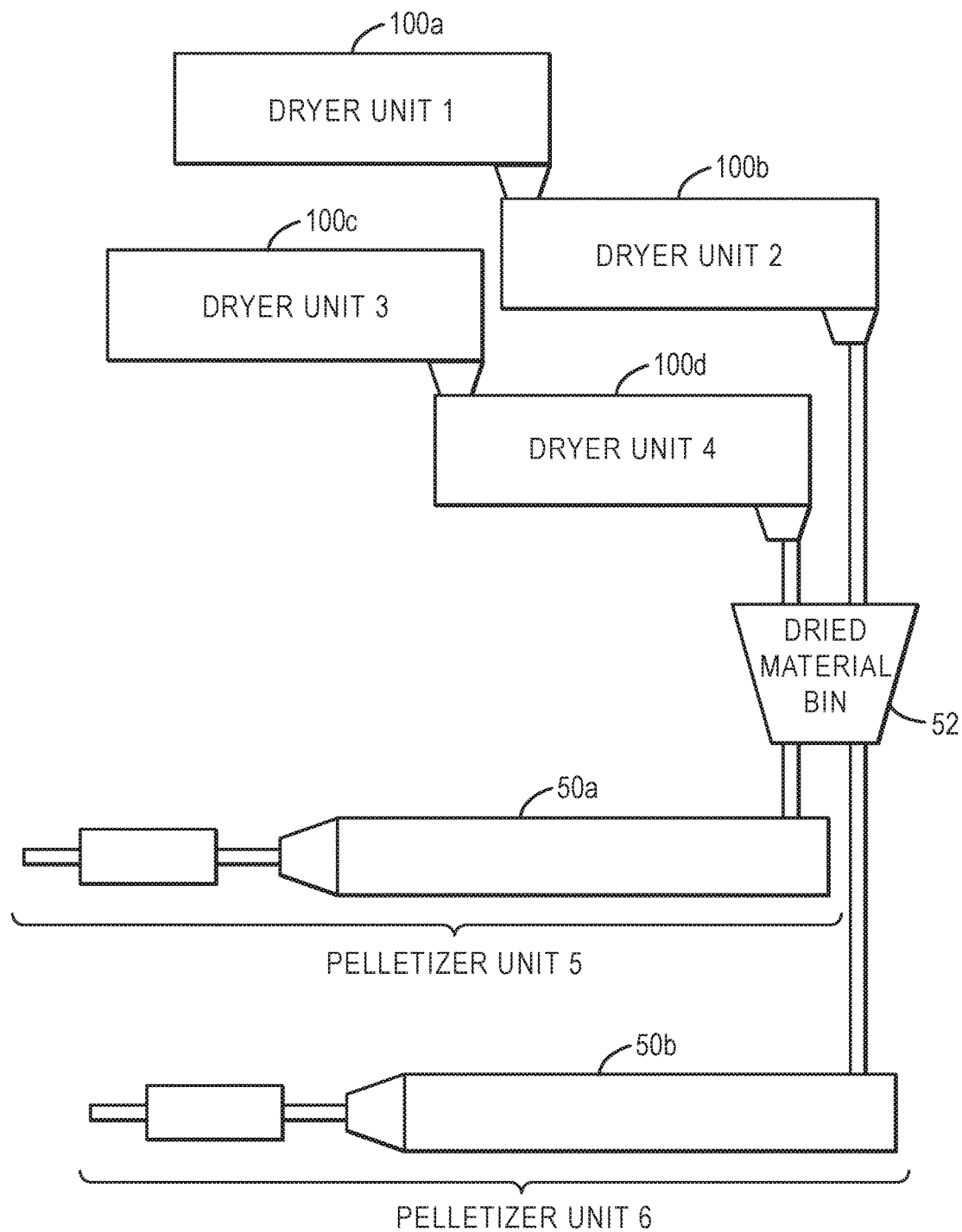
FIG. 6 is a schematic of a plurality of continuous flow dryers located in series and parallel flow feeding a plurality of pelletizers units in parallel flow.

In FIG. 6, four dryer units designated Unit 1 (100a), Unit 2 (100b), Unit 3 (100c) and Unit 4 (100d) are arranged in a combination of serial of parallel flow while supplying the final product to pellet producing Units 5 (50a) and Unit 6 (50b) that are parallel flow arrangement. Dryer Units 1 and 2 (100a, 100b) are in serial flow and dryer Units 3 and 4 (100c, 100d) are in serial flow. The combined dryer Units 1 and 2 (100a, 100b) and combined dryer Units 3 and 4 (100c, 100d) are in parallel flow relative to each other. While the systems in FIGS. 4, 5, and 6 may be applied to any material suitable to be dried or treated in a profile screw dryer, the particular arrangements shown in FIGS. 5 and 6 are preferably directed to drying distiller wet grain (DWG) in profile screw dryers as shown in FIGS. 1-3. These particular drying units supply distiller wet grain (DDG) to pellet production units, 50, 50a, 50b. The details of pellet production units shown in FIGS. 5 and 6 are fully disclosed in related U.S. patent application Ser. No. 13/448,358 which is hereby incorporated by reference.

Figure 10A:
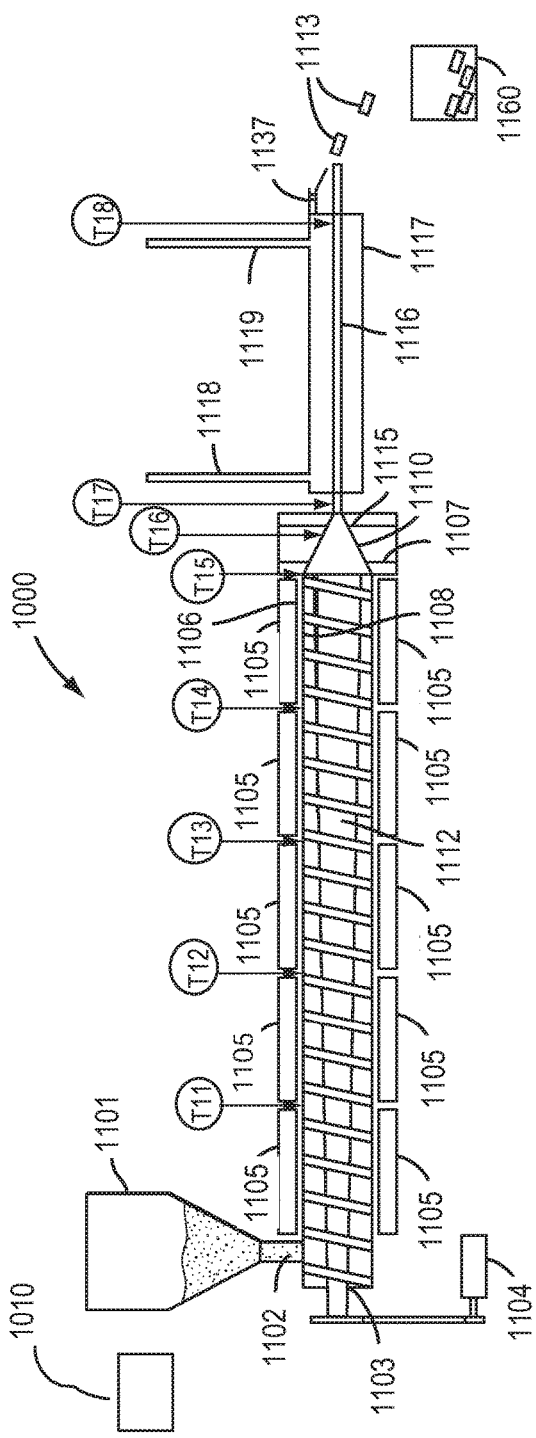
FIG. 10A shows a general schematic drawing of an exemplary embodiment of a system for producing a distiller grain pellet in accordance with the present teachings.

As described in detail in U.S. patent application Ser. No. 13/448,358, FIG. 10A shows a schematic diagram of a distiller grain (DG) pellet production device 1000 which can be used to process dried distiller grains into pelletized distiller grain product. The pellet production device 1000 can include a loading zone, which may include a hopper 1101, a heating zone, which may include heaters 1105, a compression zone, which may include a compression enclosure 1110, and a cooling zone, which may include a heat exchanger 1117. The device 1000 can include a loading zone for loading the distiller dried grains into the heating zone. Distiller dried grains supplied from hopper 1101 in loose granular form can be feed into the heating zone at an inlet chute 1102 of a profile screw extruder 1112 shown in FIGS. 10A and 11. A variable speed motor 1104 connects to the screw of the extruder and drives the screw element 1103 of the profile screw extruder.

Figure 11:
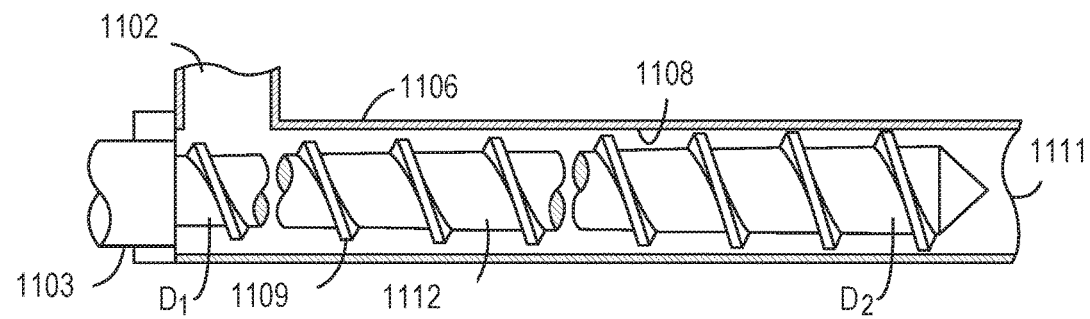
FIG. 11 shows an example of a profile screw used to compress and transport the distiller dried grains through the production line.

The distiller dried grains entering the profile screw extruder at inlet chute 1102 can have a moisture content in the range of about 10-15% by weight. As the distiller dried grain is conveyed and compressed within the profile screw extruder 1112, heat is added to the distiller dried grain by heaters 1105 positioned along the wall 1106 of the profile screw extruder. FIG. 11 shows a general shape of the profile screw 1112 where the shaft diameter increases from $d_1$ to $d_2$ along the length of the screw which creates an increasing compression force on the treated material being conveyed downward due to the rotation of the screw. The heaters 1105 can be arranged along the profile screw 1112 in heating zones where the individual heaters can be equipped with independent heater controls for creating separate heating zones where selected temperatures are maintained in the treated distiller grain as it is conveyed and compressed in the profile extruder 1112. The type of heater devices employed for heating the treated material can include but are not limited to electric heaters, combustion gas heaters, microwave heaters, solar powered heaters or any combination of these or any other suitable heating devices.

A series of temperature sensors, for example, T11, T12, T13, T14 and T15, may be embedded within the wall 1106 of the profile screw extruder. These temperature sensors can be used to monitor the temperature of the treated material so that appropriate adjustments to the heater output, distiller died grain feeding rate, and profile screw rotation rate are regulated to maintain the treated material within a desired temperature range along the treatment zones of the profile screw extruder 1112. While five temperature sensors are shown, it should be understood that there may be more temperature sensors or less temperature sensors depending on the material treated, the length of the profile screw extruder and the desired precision of temperature monitoring within the heating and compression treatment zone. It should be noted that the temperature sensors may be connected in a computer control loop where the individual heater output regulators, a profile screw extruder motor speed regulator, and a distiller grain feed flow controller may all be individually controlled by a controller 1010 to maintain preselected temperature conditions in the treated distiller grain as it travels along the profile screw extruder 1112.

In some embodiments, the heating zone may include a plurality of adjacent treatment zones. In some embodiments, the heating zone may include adjacent treatment zones where no heat is applied to the treated material. In other embodiments, the heating zone may consist of a single treatment zone. Control of the motor 1104 regulates the residence time of the treated material in the treatment zones.

In the heating zone, the process is monitored and controlled to cause a mixture of liquid and vapor from the water and oils contained in the distiller grain to begin to boil such that the distiller grain becomes modulus. The modulus state of the distiller grain enables it to better flow the restrictive passage(s) provided in the compression zone.

Figure 12:
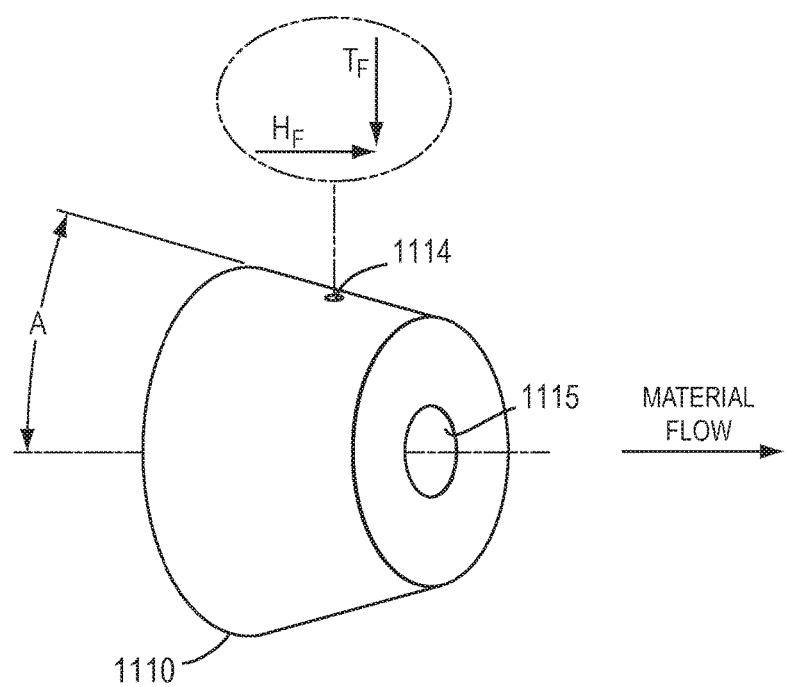
FIG. 12 shows a perspective view of a conical shaped compression enclosure positioned between a first and second die where the distiller dried grains are simultaneously compressed parallel to the horizontal axis of transport and then compressed transverse to the horizontal axis of transport.

FIG. 12 shows a conical shaped compression enclosure 1110 in the compression zone in which the heated distiller grain enters as it exits from an outlet 1111 of profile screw extruder 1112 in the heating zone. The compression enclosure 1110 can have a variety of configurations (e.g., size, shape, etc.) such that, for example, passing a treated material through the enclosure 1110 generates sufficient compressive forces on the treated material to form a dense compact material. For example, the compression enclosure may be a restrictive die 1110 as shown in the figures. In various embodiments, the pellet production device 1000 can be designed to be material specific such that the configuration of the compression enclosure 1110 (e.g., the configuration of one or more die through holes) can be selected based upon the compression rate required for the treated material selected for pelletizing.

As shown in the figures, initially, the distiller grain is forced through a first die orifice 1107 located at the entrance of die 1110 by the pressure applied to the treated material due to the rotation of the profile extruder 1112. This first die orifice 1107 generally has a cross section area that is less than the cross sectional area defined by the circumference of the inside wall 1108 of the outlet 1111 of the profile extruder shown in FIG. 11. The configuration of the die 1110 performs a critical function in the process to form the treated distiller grain. The die 1110 is configured such that the distiller grain is compressed parallel to its axis of transport and it is also compressed in a direction transverse to the direction of transport as it passes through. A simulated free body diagram of the compressive forces on the treated material at location 1114 inside the enclosure is shown in FIG. 12 where $T_F$ represents the transverse compression force and $H_F$ represents the force acting parallel to the axis of material transport. This transverse compression $T_F$ of the treated distiller dried grain strengthens the outer surface of the treated distiller grain which results in a more durable final product. The amount of transverse compression $T_F$ that is applied to the distiller dried grain in compression enclosure 1110 depends on the pressure applied by the profile extruder 1112, the length of enclosure 1110 and the angle of inclination A of the surface walls. These parameters can be selected to design a specific compression enclosure 1110 to obtain a desired outer surface durability of the final product and the type of material that is being treated. In this example, the compression enclosure is shown as a die having a conical shaped configuration. In this example, the compression enclosure is shown as a die having a conical shaped configuration.

Ideally, the transverse compression force $T_F$ and the parallel force $H_F$ are approximately equal for most, but not all applications. Several sensors can be employed to assist in monitoring the condition of the distiller grain as it passes through the compression enclosure 1110. For example, using temperature sensor T15, the temperature of the treated distiller grain can be measured prior to entering the first die orifice 1107. A further distiller dried grain temperature reading can be measured between the first die orifice 1107 and the second die orifice 1115 by temperature sensor T17. Another temperature reading can be taken at temperature sensor T18 to measure the temperature of the treated distiller grain after it passes the second die orifice 1115 and exits the die extremity tube 1116.

Due to the process of creating pressure in the compression enclosure 1110, the moisture (mainly corn oil) in the distiller grain is forced to the outside walls of the extrudate after exiting the second die orifice 1115. Thus, the mixture of heated liquid and vapor from the oil and water in the distiller grain migrates to and collects on the outer surfaces of the treated distiller grain to form a lubrication layer. The oil functions as a lubricant between outer surface of the distiller grain and the inner wall of the die extremity tube 1116 and helps the distiller grain to pass through the die extremity. The treated distiller grain is still in a relatively modulus state when it is directed into a die extremity tube 1116. The modulus state of the treated material enables it to easily deform elastically and conform to the shape of the die extremity tube 1116. The diameter and shape of the die extremity tube 1116 can be selected according to the desired shape and size of the final product. In some embodiments, the compression enclosure 1110 may include a plurality of die extremity tubes 1116, as shown in FIGS. 13 and 14. For example, the die extremity tubes 1116 may have a cross section opening that will produce a round, square, rectangular or oblong shape to name just a few of the possible configurations. FIG. 13 shows a modified compression enclosure 1110a with multiple die openings 1115. FIG. 14 shows different die extremity tubes 116 having different diameter and shape extending from the modified compression enclosure 110b. Some examples of the different kinds of cross sections may include round, square, rectangular, star shaped, triangular etc. It should be understood that the cross-sections of the die extremity tubes 1116 depicted in the figures are exemplary only and those having ordinary skill in the art would appreciate that a variety of geometric structures having differing configurations and numbers may be substituted for or used in conjunction with the die extremity tubes 1116. The plurality of die extremity tubes 1116 may include geometric structures of the same or differing configurations.

Figure 10B:
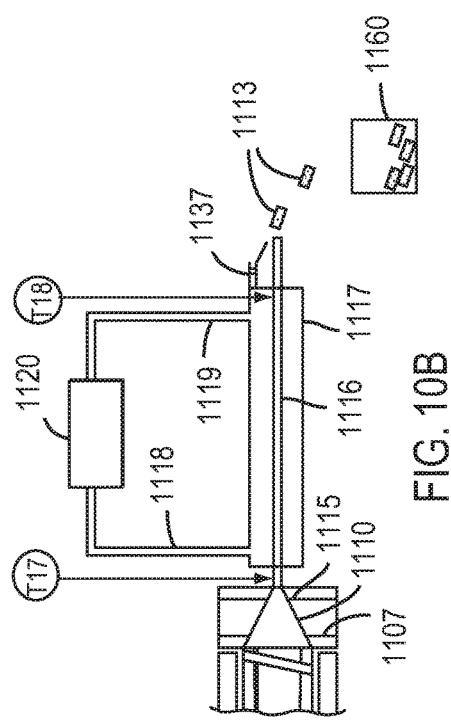
FIG. 10B shows another exemplary embodiment of a system for producing a distiller grain pellet in accordance with the present teachings.

As the treated distiller grain is pushed through the die extremity tubes 1116, the distiller grain may be cooled in a heat exchanger assembly 1117. In FIG. 10A, the heat exchanger assembly may use water as its cooling agent and the cooling water enters or exits the heat exchanger 1117 by way of pipes 1118 and 1119. Either of pipes 1118 or 1119 can be used as the entry point or exit point of the cooling water depending on the type of flow that is desired in the heat exchanger. In FIG. 10B the heat exchanger 1117 is cooled by a cooling medium processing device 1120. The cooling medium processor 1120 can be in the form of any known cooling system. A partial listing of cooling devices and methods that may be used would include cryogenic coolers, refrigerated air heat exchangers, water chillers, cooling towers and any other known cooling device or combination of cooling devices that are capable of cooling the treated distiller grain to a stable internal temperature before it is discharges as a final product. Another exemplary cooling system for multiple die extremity tubes is shown in FIG. 14. In this arrangement two different shaped die extremity tubes 1116a and 1116b are cooled in heat exchangers 1117a and 1117b. The control of the flow of the coolant to the heat exchangers 1117a, 1117b is regulated by control valves 1125a and 1125b. Valve control regulators 1126a and 1126b can be set to maintain different cooling rates in heat exchangers 1117a and 1117b. The valve control regulators 1126a and 1126b could also be functionally connected to temperature sensors 1128a and 1128b located in the heat exchangers 1117a or 1117b or in the die extremity tubes 1116a or 1116b to control the flow of coolant through valves 1125a and 1125b to maintain a desired temperature in the heat exchanger, the die extremity tubes or treated distiller grain.

Figure 15:
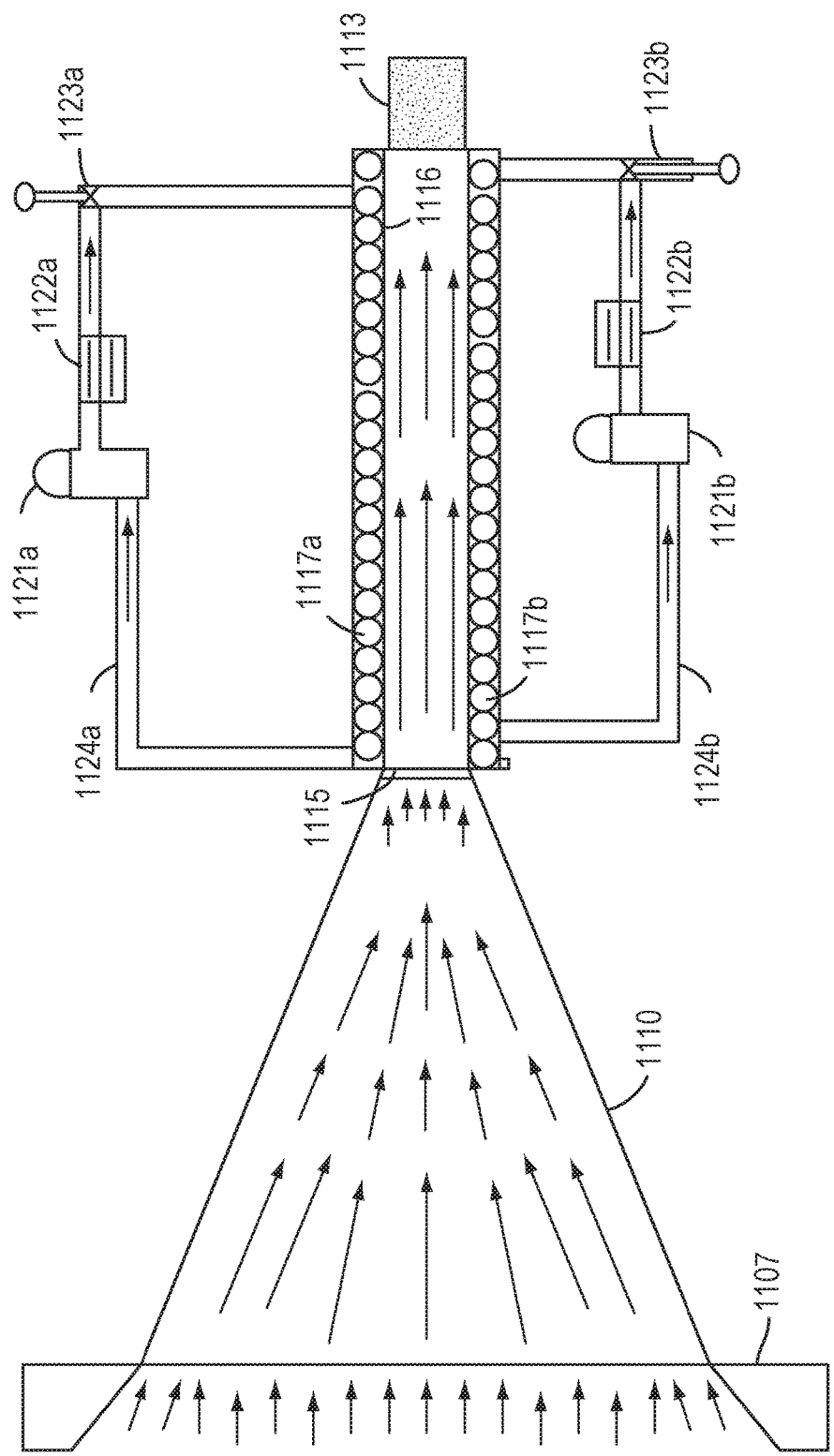
FIG. 15 shows a heat exchanger arrangement using a compression refrigeration system to cool the extruded distiller grain feed in the die extremity.

Another exemplary embodiment of a cooling arrangement is shown in FIG. 15. In this arrangement, two vapor compression refrigeration systems are used to cool the treated distiller grain in the die extremity tubes. Refrigeration compressors 1121a and 1121b direct compressed refrigerant vapor to condensers 1122a and 1122b. The condensed refrigerant is than passed through expansion valves 1123a and 1123b where low pressure cool refrigerant is then passed into heat exchangers coils 1117a and 1117b. The evaporated refrigerant gas exiting heat exchangers coils 1117a and 1117b is then passed back to the suction side of compressors 1121a and 1121b by way of lines 1124a and 1124b. The refrigeration systems of FIG. 15 can be regulated by well-known refrigeration control devices. While a dual compression refrigeration system is disclosed as the cooling means for the treated distiller grain in FIG. 15 a single compression refrigeration cycle system could also be used to provide cooling refrigerant to a single cooling coil.

The cooling process has a significant impact on the physical properties of the final product. The amount of cooling is regulated to ideally produce a stable and cohesive final product which is discharged from the die extremity tubes 1116. If insufficient cooling is applied during the cooling process, then the product exiting the die extremity tubes may possibly explode or over expand due to excessive pressure inside of the treated distiller grain. In certain situations as illustrated in FIG. 14, it may be necessary to apply different cooling rates to die extremity tubes 1116a and 1116b extending from the same compression enclosure 1110b when the size and shape of the die extremity tubes are different or to produce two or more different final products having different properties. If excessive cooling is applied during the cooling process, this could result in an increase in friction between the die extremity inner wall and the treated distiller dried grain. As a result, this may increase the power required to push the finished product out of the die extremity tube. In the worst case scenario, the treated distiller dried grain may become lodged in the extruder die tube 1116.

Figure 16A:
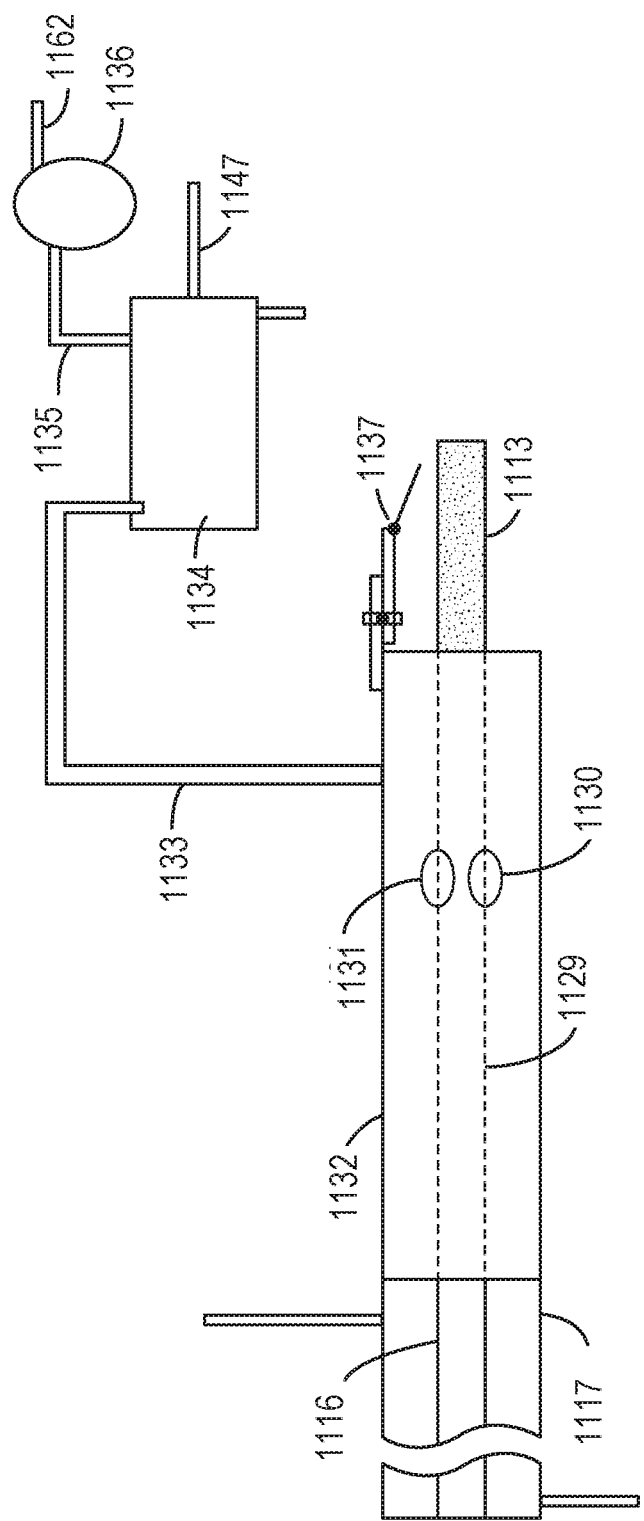
FIG. 16A shows the collection and vacuum system that extracts and collects oil from the extruded distiller grain exiting the cooling heat exchanger.
Figure 17:
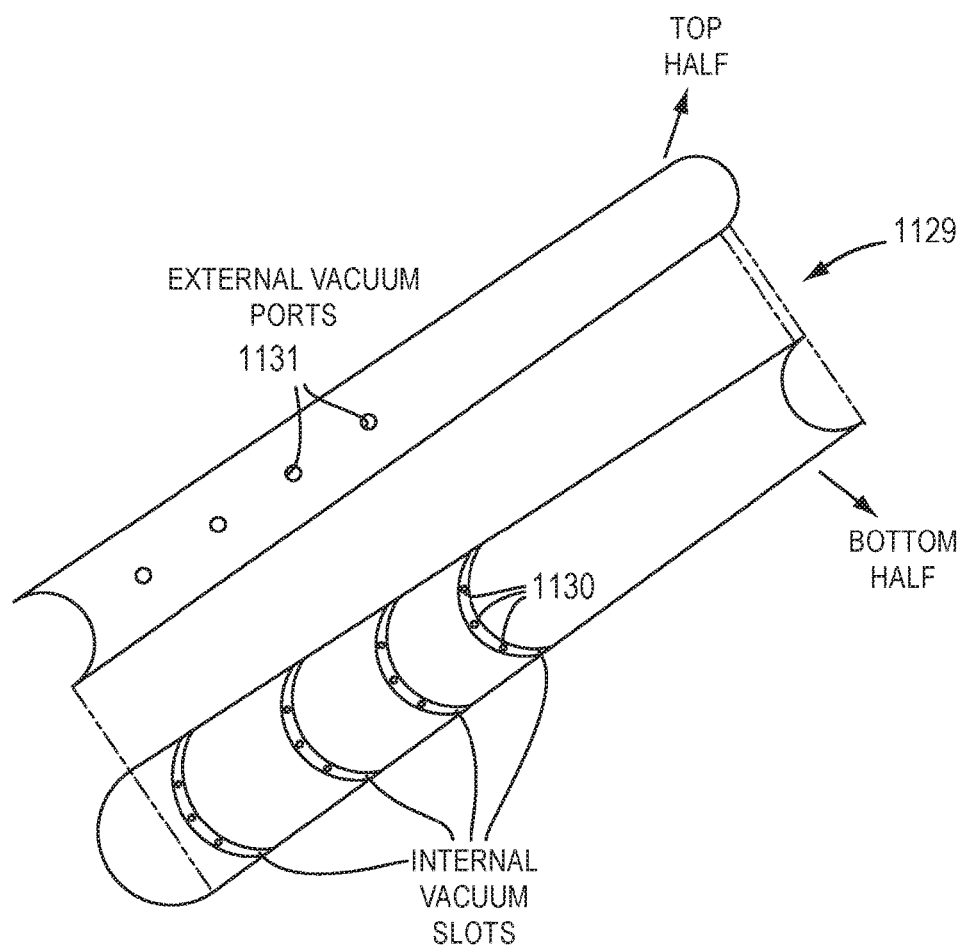
FIG. 17 shows details of the perforated die extremity that permits oil, water and vapor to be vacuumed out of the treated distiller grain.

FIG. 16A shows an optional water/vapor and oil extraction and recovery system. In this arrangement, the extraction system is deployed at the end of the die extremity tube 1116. The distiller grain exiting the die extremity tube 1116 enters a perforated pipe 1129 having perforations 1130 that are arranged in slots around the lower portion of pipe 1129. Perforations 1131 are provided in the upper portion of pipe 1129. Pipe 1129 is surrounded by a tube 1132 that includes a collection pipe 1133 which in turn is connected to separating vessel 1134. FIG. 17 shows further details of the perforations 1130 and 1131 in pipe 1129. A pipe 1135 is connected to the inlet of a vacuum pump 1136 which discharges into pipe 1162. When the vacuum pump is operated, a vacuum is created in the space between the inner wall of tube 1132 and the openings 1130 and 1131 in the perforated pipe that are exposed to the surface treated distiller dried grain inside pipe 1129. The vacuum acts to extract oil, water and/or vapor from the surface and the interior of the treated distiller grain through the openings 1130, 1131 as the treated material passes through inside pipe 1129. The collected oil, water and/or vapor are then directed to the separator tank 1134 by way of pipe 1133. The separation tank 1134 directs the collected oil, water and/or vapor through a path that separates the oil from the water within the separator tank. The oil is then drawn out of the separation tank to be used on site or to be shipped out to be processed into other products such as diesel fuel. The water may be collected and used on site or it may be discharged out of pipe 1147.

Figure 16B:
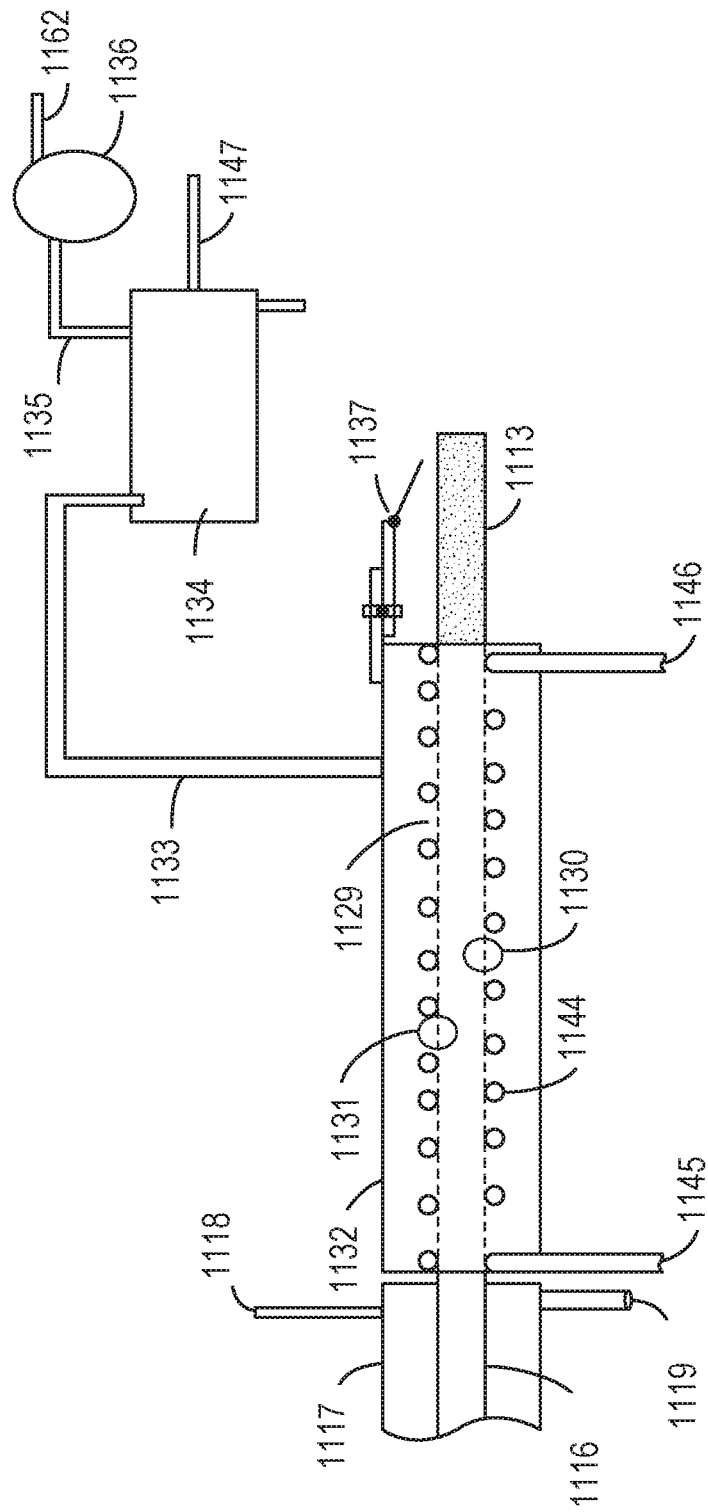
FIG. 16B shows an alternative embodiment of FIG. 16A where a cooling heat exchanger is mounted around a perforated die extremity.

An alternative embodiment of a water/vapor and oil extraction system is shown in FIG. 16B. This embodiment permits the possible application of two different cooling sources in the cooling process for the treated distiller grain. After the treated distiller grain is cooled in a preliminary heat exchanger 1117, the treated distiller grain is directed to an additional heat exchanger arrangement in the form of a coil 1144 that is wrapped around a perforated pipe 1129 having perforations 1130 and 1131. The first heat exchanger 1117 may be cooled, for example, by water and the second heat exchanger cooled by a compression vapor refrigeration system similar to that shown in FIG. 15. Other cooling sources may be applied to either heat exchanger 1117 and 1144 as desired. The heat exchanger 1144 includes coolant inlets and outlets 1145 and 1146. The inlets and outlets 1144 and 1145 are interchangeable depending on the type of coolant flow desired. The perforations 1130 and 1131 are located between the coils 1144 that form the heat exchanger. A tube 1132 encloses the heat exchanger 1144 and the perforated pipe 1129. The perforations 1130 and 1131 are spaced such that they are not covered or obstructed by the heat exchanger coils 1144. The space between the inside wall of pipe 1132 and the perforations 1130 and 1131 in pipe 1129 are subjected to a vacuum by way of pipe 1133 that is connected to separating tank 1134 and vacuum pump 1136. In this particular embodiment, the vacuum created inside pipe 1132 tends to draw the treated distiller dried grain against the inside wall of perforated pipe 1129 to provide better heat transfer between the treated distiller grain and heat exchanger coils 1144. If the treated distiller grain exiting the second die 1115 in the compression enclosure 1110 is sufficiently stable, the treated distiller grain may be simply pushed through the first heat exchanger 1117 and the cooling process may be implemented in the second heat exchanger 1144.

Figure 18A:
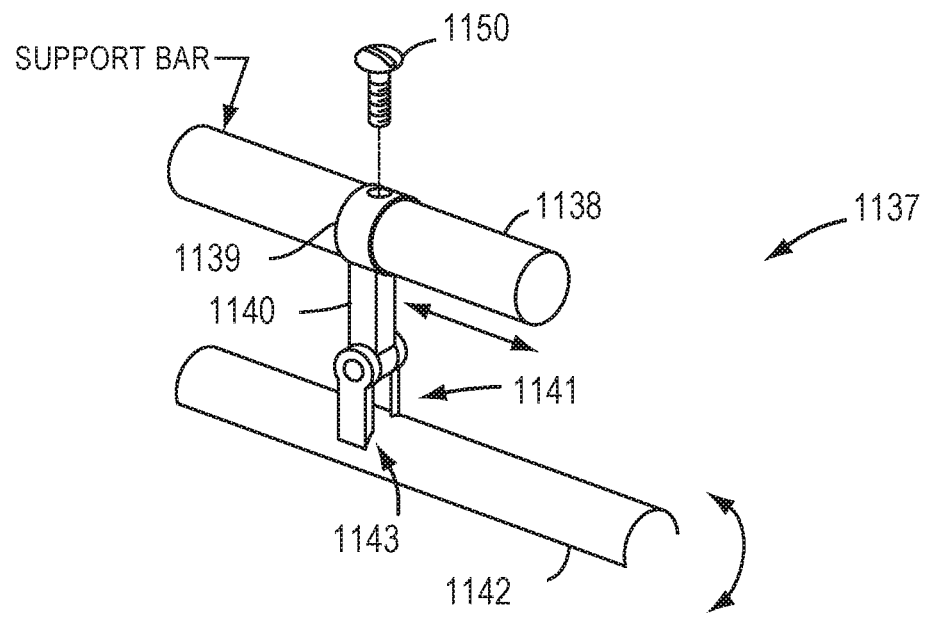
FIGS. 18A-18B show the device that adjusts the length of pellets exiting the die extremity.
Figure 18B:
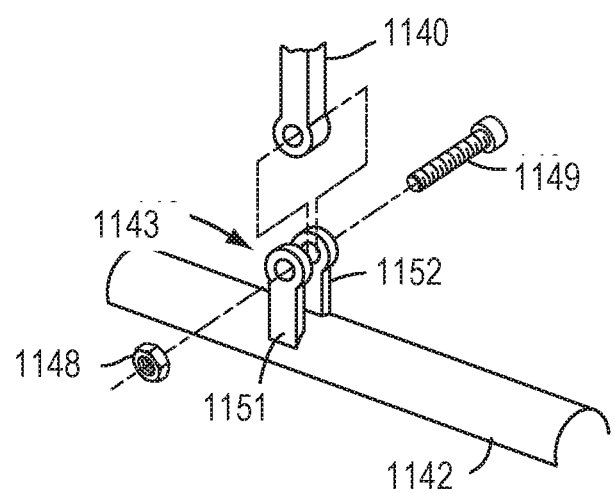

FIG. 18A shows a cutting device 1137 that may be used after the cooling process to cut the treated material into pellets having a desired length. The pellets may also be referred to as range cubes. The cutting device 1137 includes a mounting bar 1138 a lateral adjustment clamp 1139 that is connected to a connecting rod 1140 which is pivotally connected at pivot 1143 to the pellet length adjustment member 1142. A locking bolt 1150 screws into the top of clamp 1139 to secure the lateral position of the connecting rod 1140 on the support bar 1138. The pivot point 1143 shown in FIG. 18B comprises two spaced apart members 1151 and 1152 that receive connecting rod 1140. Members 1151, 1152 and 1140 are secured in a pivoting relationship by bolt 1149 and lock nut 1148. The pivot 1143 may be in the form of a ball and socket or any other device that will permit adjustable pivotal motion between the connecting rod 1140 and pellet length adjustment member 1142. The support bar 1138 can be mounted on the end of the die extremity tube 1116 or other support member. In FIGS. 10A, 10B, 16A, and 16B, this cutting device 1137 is positioned above the exit point of device 1000 such that it cuts the treated material into pellets, which may be collected into a container 1160. By adjusting the lateral position of the pellet length adjuster 1142 along the support bar 1138 and also adjusting the angle of inclination of the pellet length adjuster 1142 at pivot point 1143, element 1142 can be arranged to exert a selected degree of downward force on the treated distiller grain exiting the die extremity tube 1116 which determines the length of the resulting pellets 1113.

In general, the present teaching relates to an apparatus and method of taking wet and dry distiller grains and articles alike and feeding them into an extruder, which may be configured having a continuous screw and barrel arrangement 1106. The distiller grains and articles alike are conveyed through the screw of the extruder while the screw and barrel are heated in zones to prescribed temperatures which brings the distiller grain moisture (water and corn oil) close to a boiling point where the distiller grains become modulus to the point where it will flow through a restrictive die 1110 that substantially reduces the orifice size. Pressing the grain as it flows through the restrictive die creates substantial pressure (2,000 to 10,000 PSI) between the tip of the screw(s) of the extruder and the restriction of the orifice in the die. The pressure created by the restriction of the die makes the distiller grains pack densely in the die. The greater the difference between the first die orifice 1107 and the second die orifice 1115, the greater the pressure created upon the distiller grain and thus the greater the density of the distiller grain extrudate will be.

During this process of creating pressure, the moisture (mainly corn oil) is forced to the outside walls of the extrudate after it has left the second die orifice 1115. The oil allows the product to function as a lubricant between the outside wall of the extrudate and the inner wall of the die extremity 1116 which will form the shape of the final extrudate desired. This lubrication helps the extrudate pass through the die extremity. The longer the length of the die extremity (land time) is the more drag it creates upon the extrudate and also increases the pressure between the first die orifice 1107 and the second die orifice 1115. The die extremity is quite lengthy because the extrudate needs to be cooled well below the boiling temperature of water and corn oil combined under pressure (about +140F). This is done by creating cooling passage ways or circuits that are located around the die extremity creating a heat exchange coil. Liquid and gas refrigerants are passed through the heat exchanger in a closed loop fashion with the assistance of a refrigeration compressor. A temperature controller where the liquid and gas refrigerants are cooling the die extremity and the die extremity cools the extrudate via conductive heat transfer. A vacuum may need to be created and pulled from the inside of the die extremity via vacuum slots 1130, 1131. Using, for example, a continuous vacuum pump, the vacuum is created to constantly pull the external surface of the extrudate against the internal walls of the die extremity to create effective wall contact in order for conductive heat transfer to occur. If effective cooling does not occur before the extrudate leaves the die extremity, then the extrudate may simply split open relieving the boiling gas of the water and corn oil mixture and damaging the integrity and size and shape and density of the extrudate. In some embodiments, as shown in FIGS. 13-14, multiple die extremities 1116, 1116a, 1116b may be included on the same die to allow for high volume output of extrudate but still allowing a slow speed within each die extremity for longer dwell time to achieve adequate cooling. The examples in FIGS. 13-14 show only two to three multiple die extremities extending from a single die, but the design is not limited to this exemplary embodiment. The device has been designed and manufactured to include, for example, fifteen to twenty die extremities extending from a single die.

Figure 19:
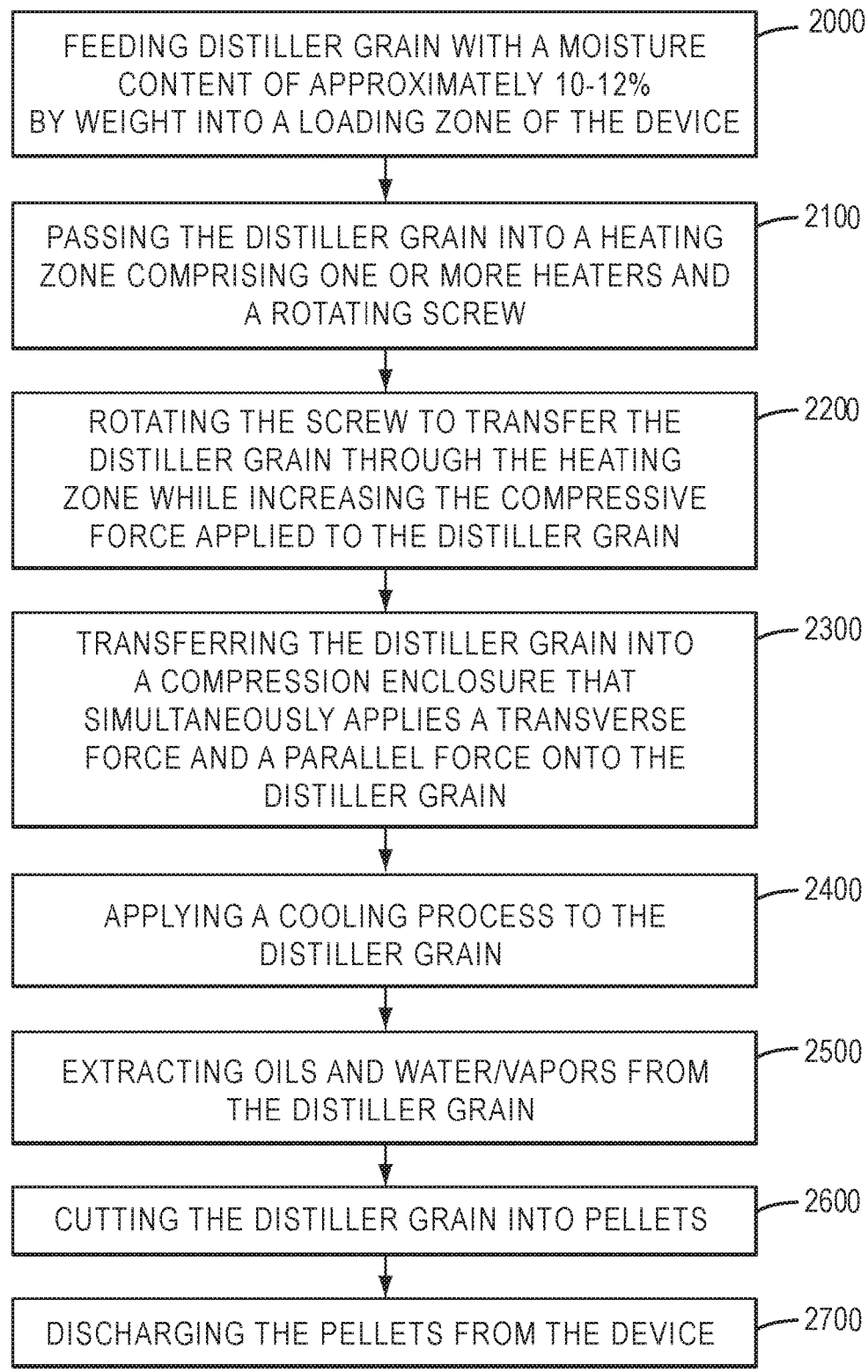
FIG. 19 illustrates an operational flow chart of a method of producing distiller grain pellets utilizing the device in accordance with the present teachings.

FIG. 19 illustrates an operational flow chart of a method for producing the distiller grain pellets utilizing the device in accordance with the present teachings. Dried corn distiller grain with a moisture content of about 10-12% by weight is feed into hopper at block 2000. The dried corn distiller grain is passed into a heating zone comprising one or more heaters and a rotating screw as indicated in block 2100. The dried corn distiller grain is gradually heated in by electrical heaters, for example, in five heating zones where the dried corn distiller grain is heated to about 140 degrees Fahrenheit by the time it arrives at the location designated as T5. Rotation of the screw transfers the dried corn distiller grain through the heating zone while simultaneously increasing the compressive force applied to the distiller grain as indicated at block 2200. At this point oil and water in the treated corn distiller begins to boil. The distiller grain becomes modulus such that it is capable of flowing through the restrictive die. The dried corn distiller grain is transferred into a compression enclosure that simultaneously applies a transverse force and a parallel force onto the distiller grain as indicated at block 2300. The dried corn distiller grain is pressed through the first die orifice 1107. As the dried corn distiller grain is compressed and conveyed to the second die orifice 1115 near a location designated as T16, its temperature has increased to approximately 180-200 degrees Fahrenheit. Controlling the density of the treated material, the dried corn distiller grain begins to transform into a cohesive dense elastic material and the oil migrates toward the outer surface of the distiller grain at the second die orifice. With the oil and water acting as a lubricating agent to assist in pressing the material through the second orifice 1115, for example, having a ¾ inch diameter, the material is passed through to one or more die extremities where a cooling process is then applied to the distiller grain as indicated at block 2400. In the cooling zone, the distiller grain enters a water cooled heat exchange 1116 where it is cooled to an internal temperature of less than 140 degrees Fahrenheit at a location designated as T18 before exiting as a dense durable and stable product, without the addition of binders and fillers. Optionally, oils, water, and vapors can be extracted from the distiller grain as it exits the cooling zone as indicated at block 2500. The distiller grain can now be cut into nutritional pellets or cubes having a desired length or shape as indicated at block 2600 and discharged from the device into a container as indicated at block 2700.

In various embodiments, in addition to producing pellets/cubes, device 1000 may be employed to produce a final product shaped as large tubs having distiller grains compressed therein. The farmers can put out the tubs and not have to feed pellets/cubes to the livestock every day. The tubs may weigh approximately 200 pounds and the density of the tubs limits the intake of the supplement to roughly 2-pounds of product per day, which allows the livestock eating the product to meet their daily requirements.

It will be apparent to those skilled in the art that various modifications and variations can be made to the pellet producing device and method of the present disclosure without departing from the scope of its teachings. In various embodiments, a wide variety of different kinds of pellets, cubes or tubs can be produced from various loose granular materials using substantially the same device since virtually unlimited numbers of shapes of the compression enclosure and one or more die extremity tubes can be designed and used to meet the requirements of a particular loose granular material. For example, the device may be used to compress feeding products such sorghum.

It should be noted that various embodiment of the device includes a controller 1010 that controls various sensors and components, such as pressure sensors, humidity sensors, temperature sensors, and drive controls, positioned in various locations throughout the device and connected in a computer control loop to set, maintain and control preselected conditions such as temperature, pressure, humidity, density, flow rate, and residence time in the treated material and/or components of the system.

Referring back to FIGS. 4, 5, and 6, using multiple drying units connected in parallel, series, or both can enable simultaneous multiple drying stages, the combination of the treated material at different stages, and splitting the treated material into two or more drying or discharge paths. The decision to use multiple drying units can be dictated by the size, length and cost of available off-the-shelf single profile screw extruder assemblies and the size of the facility. Another major consideration that may determine whether single or multiple dyer units are used is the physical constraints of the facility in which the drying system will be housed.

Figure 7:
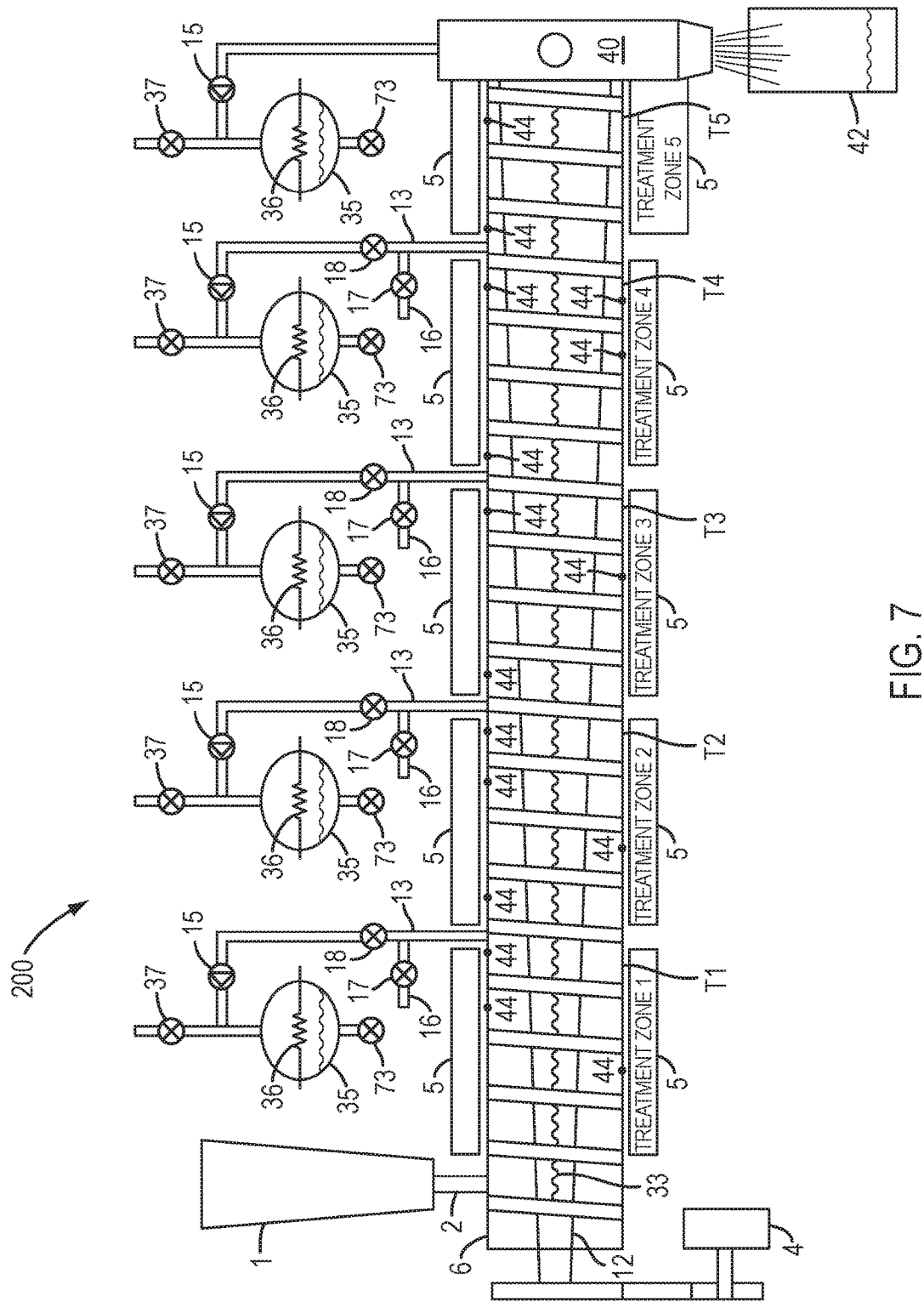
FIG. 7 is another exemplary embodiment of the apparatus arranged as a continuous flow distiller.

Another embodiment of the invention is shown in FIG. 7 where a profile screw extruder is arranged as a continuous flow distiller system 200 to distill gases and vapors emitted from a wet or dry bulk material that is supplied to hopper 1. During use on a treated material having two or more liquids, the continuous flow distiller system 200 employs one or more heaters 5 to heat the material as it moves downward the screw 12 such that at a designated treatment zone only one of the liquids vaporizes and can be drawn off by a vacuum to be collected. With the control of the treatment zone pressures by vacuum pumps 15, the control of motor 4 that regulates the residence time of the treated material in the treatment zones and the regulation of the heaters 5 and rotor heater 33, gases and vapors that have different boiling points can be collected and condensed in separate condensing vessels receiving the gases or vapors.

For example, if the treated material is mash that is produced in the fermentation process for ethanol/alcohol and is fed directly into hopper 1 before the ethanol/alcohol is distilled out of the mash, typically, the mash may contain three different liquids, for example such as water, ethanol/alcohol, and some corn oils, which have three different boiling points. The distiller system 200 may be operated such that each of the liquids within the mash is successively targeted to be drawn off at different treatment zones. In this example, the conditions and the parameters of the system 200 can be maintained so that initially the ethanol/alcohol which has the highest vapor pressure is targeted at the first stage for collection while the water and corn oil remain in the material. Then at the second stage, the water may be targeted for collection and the conditions maintained to prevent the corn oil from evaporating at the second stage. At the third stage, finally, the corn oil may be targeted for collection.

During operation of system 200 at the first treatment zone, according to this example, given that alcohol/ethanol in the mash has a higher vapor pressure than that of water and corn oil, the system can be configured to selectively control the temperature, heaters 5, the profile screw rotation and pressure by vacuum pump 15 in the first treatment zone to create a temperature and pressure environment in the first treatment zone that will target and encourage the alcohol/ethanol to evaporate and leave the less volatile water and corn oil in the treated material to be collected in a suitable environment downstream from the first treatment zone. The alcohol/ethanol that is evaporated and collected in vessel 35 can be condensed by a condensing heat exchanger 36 that is supplied with a cooling medium that is capable of condensing the alcohol/ethanol into liquid form. The valve 73 at the bottom of vessel 35 can be used to draw down the collected liquid product that will be sent to storage for further possessing or to shipping as a final product.

In the second treatment zone, the system 200 is configured to provide sufficient heating by heaters 5 in treatment zone 2 along with the production of sufficient vacuum from vacuum pump 15 so that the water intentionally carried over from the first to the second treatment zone in the treated material will now be targeted for evaporation. Again the temperature and pressure that is created inside the profile screw in the second treatment zone is sufficient to evaporate the water but the conditions are controlled to prevent the evaporation of the less volatile corn oil that remains in the treated material. The evaporated water is condensed in vessel 35 and a cooling medium that is capable of condensing the water vapor into liquid is supplied to heat exchanger 36.

In the next stage in treatment zone 3, the corn oil is the targeted for collection. At this point, most of the alcohol/ethanol and water will have been removed from the treated material which leaves a more solid mass that is subjected to the compression effect of the profile screw as the material approaches the exit end 40 of the treatment device. The combination of the controlling the heating, the vacuum produced by vacuum pump 15, the material residence time in the treatment zone and the compression created by the profile screw, the corn oil and or other high vapor pressure substances can be collected as liquid through the process of condensation in vessel 35 by way of cooling medium provided to heat exchanger 36. As shown in FIG. 7, each collection vessel can include a venting valve 37 to permit venting of the collection vessel when necessary. In this example, after treatment zone 3, the material continues to be heated and conveyed downward along the profile screw extruder 12 through treatment zones 4 and 5. At the exit end of the distiller device, a venting tube 13 collects gas or vapors drawn out of housing 40 at the discharge end of the distiller by vacuum pump 15 and these collected gases and vapors are condensed in vessel 35 by cooling medium heat exchanger 36. Namely, a plurality of treatment zones can be disposed along the housing for treating the treated material moving along the at least one screw and for successively extracting a different liquid having a different boiling point from the treated material at different and some successive zones by creating a temperature and pressure within a selected treatment zone sufficient to target for extraction of a selected liquid, without extracting other liquids contained in the treated material as the treated material travels successively through the plurality of treatment zones.

While the previous example shows alcohol/ethanol collected in the first treatment zone, and the water and oil being collected in the second and third adjacent treatment zones, in actual practice, the collection zones may include adjacent treatment zones where the same product is collected. There can also be adjacent treatment zones where no vapor or gas is collected. Several treatment zones may be physically located adjacent to each other, but the treated material can be conveyed through several treatment zones where no gases or vapors are collected and condensed. The selection of the particular treatment zones where selected gases or vapors will be collected will vary for different materials and the capability of the heating devices and the strength of the vacuum that can be generated by the vacuum pumps to evacuate each treatment zone inside the profile screw extruder. The apparatus is designed to provide maximum flexibility regarding how the desired treatment zones and collections zones are arranged to accommodate the specific requirements of collecting and condensing a wide range of vapors and gases from a wide variety of materials.

Another feature of this example is the creation of a water vapor flow curtain to maintain the boundary integrity of the alcohol/ethanol from mitigating down the screw and contaminating the collection of the corn oil and vice versa, where no physical separation barriers are provided in the system. The treatment zone where water is collected can function as an intermediary buffer zone between the first zone where alcohol/ethanol is collected and the third treatment zone where the corn oil or high vapor pressure product is collected. Since the collected water in this example most likely has little commercial value, it is a disposable product. Thus, the inclusion of some water in the either the collected alcohol/ethanol and the collected corn oil is acceptable in order to control the vacuum pumps in all the treatment zones such that the evaporated water vapor in the second zone creates a net positive flow at the lowest flow level that can be maintained to both of the adjacent treatment zones. This net water vapor flow to the adjacent treatment zones creates a water vapor flow curtain that helps maintain the integrity of the condensed liquids in the zones adjacent the water vaporization treatment zone. This feature may be needed in some embodiments due to the fact that there is no physical barrier to prevent potential gas flow between adjacent treatment zones. By creating this net flow of water vapor to the adjacent zones, the system actually creates a barrier between the first zone where the alcohol/ethanol is collected and the third treatment zone where the corn oil or low vapor pressure products are collected. To facilitate the vapor curtain, pressure sensors 44 can be installed in the treatment zones to measure the pressure and assist in determining if there is a net flow of water vapor created by the intermediary zone to the adjacent zones. The pressure sensors 44 also provide input to the vacuum pump control to maintain the net water vapor flow by adjusting the vacuum pump speed to maintain the net vapor flow to the treatment zones adjacent the intermediary treatment zone where water is evaporated from the treated material.

In certain situations water may be added to a product being treated so that a water vapor curtain can be created to assist in the collection and condensation of certain vapors and gases. Control systems to regulate vacuum pump speed according to measured flow or measured pressures are well known and would be adaptable to control the net vapor flow in this application as desired. It is also noted that, in some embodiments, this continuous flow distillation device can be arranged to collect and condense only one type of gas or vapor, rather than various gases at different stages. This particular arrangement can be configured comprising only one long treatment zone having the same temperature and pressure throughout the length of the apparatus and the same gas and vapor is collected and condensed in all of the collection vessels 35. After the treated material exits the last treatment zone, a dried product is collected as an intermediate product for further processing or a final product of DDG when DWG is the material being initially treated. One of the many benefits of this system as applied to alcohol/ethanol mash distillation is the potential elimination of the tradition distillation step where the ethanol is boiled out of the mash in the fermenting vessel which appears to be less efficient than the continuous flow distillation accomplished by the present invention. Another material that may benefit from being treated in this continuous flow distillation apparatus may be coal sands which contain a variety of volatile components that can be extracted and condensed at different treatment zones created within the continuous flow distillation apparatus as set forth above.

Figure 8:
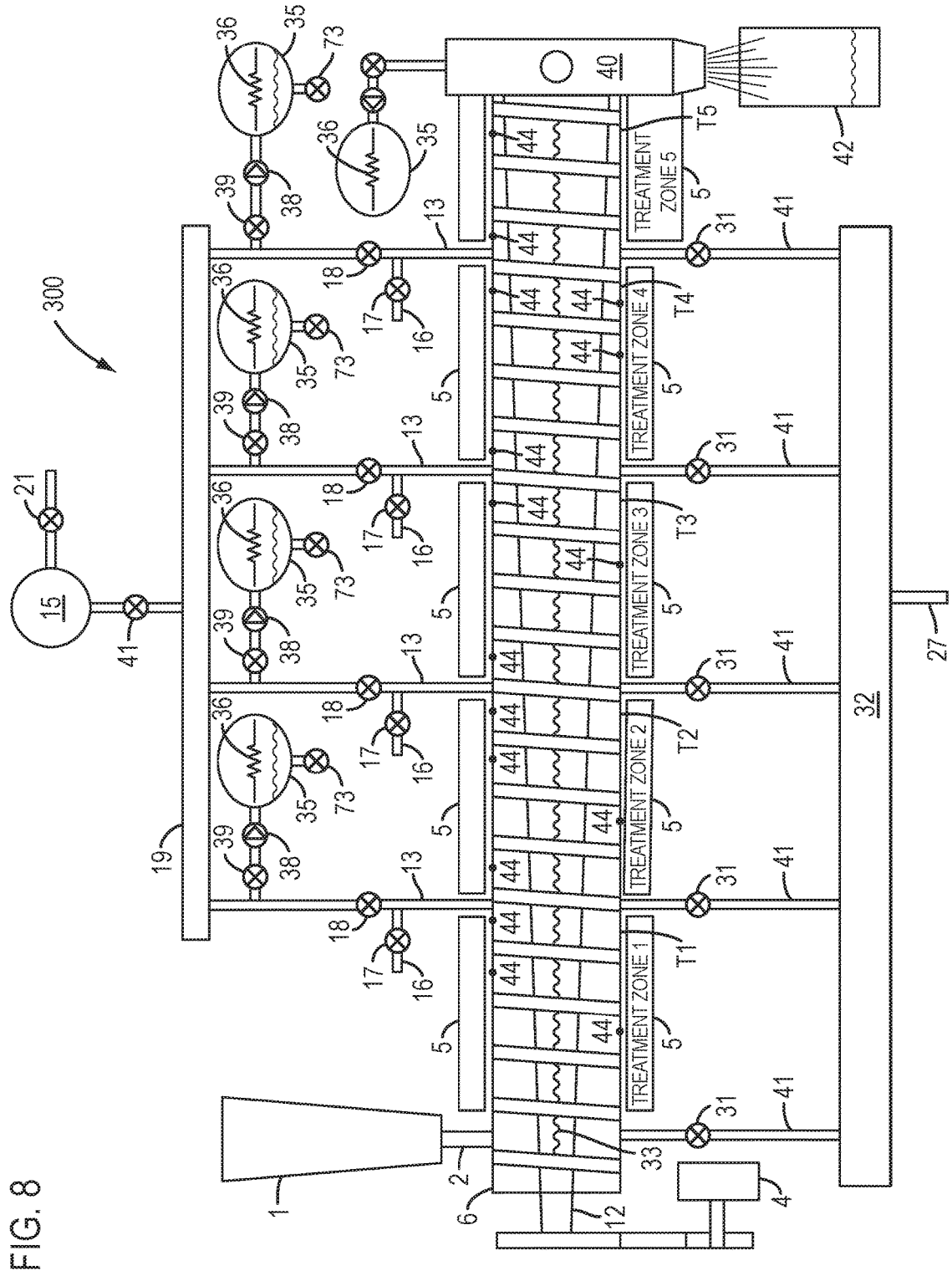
FIG. 8 is another exemplary embodiment of the apparatus is arranged to be converted between a continuous flow dryer and a continuous flow distiller.

FIG. 8 shows another embodiment of the invention where both drying and distillation can be accomplished within a single dryer and distiller system 300. System 300 can be configured to combine various components, features, and operating parameters, as shown and described above with regards to FIGS. 1-7. Collection vessels 35 similar to those shown in FIG. 7 collect and condense selective vapors or gases as set forth in the description of FIG. 7 above. The collected gases and vapors are supplied to the collection vessels 35 by the discharge of secondary vacuum pumps 38. This system can be converted into a drying device by closing valves 39 to the collection vessels 35, opening valves 18, 21, 39, respectively, shutting down secondary vacuum pumps 38 and starting up main vacuum pump 15. When the system is operating in the drying mode, the gas handling system shown in FIG. 3 is operated to control the drying gas recirculation and energy reclamation system as set forth in the description of FIG. 1 and FIG. 3. The use of series or parallel unit arrangements as presented for the dryer units in FIGS. 4, 5, and 6 could also be used for the distiller units set forth in FIGS. 7 and 8.

Figure 9:
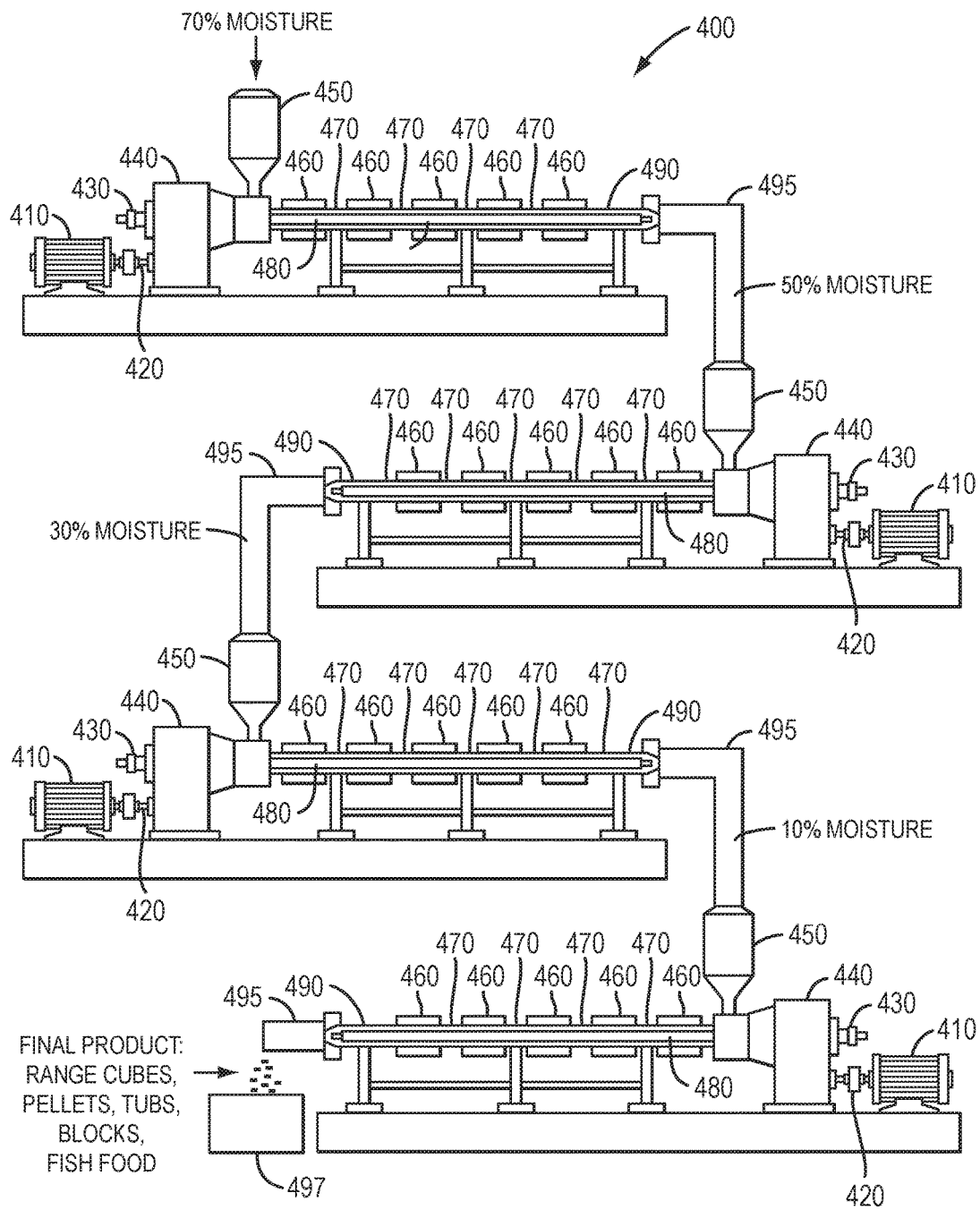
FIG. 9 is another exemplary embodiment of a plurality of continuous dryers.

FIG. 9 illustrates multiple dryers, as shown in FIG. 1, transferring the wet bulk material from one dryer to another dryer drying the product at different stages. The multiple dryers in FIG. 9 can include, for example, a motor 410 having an input shaft 420 coupled to the gearbox 440 to rotate the output shaft 430, which in turns drives the profile extruder screw 490. The wet bulk material can enter the profile extruder screw 490 at feeder 450 and the material may have a moisture content in the range of approximately 70%-80%. As the material is conveyed downward in the barrel 480 of the screw, heat can be added to the material by one or more heaters 460 and vents 470 can be disposed along the length of the barrel 480. In FIG. 9, the final product is dispensed at a dispensing end 495 and collected in a bin 497. In alternative embodiments, some or all the product can be dispensed at a dispensing end 495 and collected in a bin 497 positioned at various intermediary stages of the drying process.

It will be apparent to those skilled in the art that various modifications and variations can be made to the ear plug system and method of the present disclosure without departing from the scope its teachings.

Other embodiments of the disclosure will be apparent to those skilled in the art from consideration of the specification and practice of the teachings disclosed herein. It is intended that the specification and examples be considered as exemplary only.

What is claimed is:

1. A continuous flow dryer system, comprising:
a source for supply of a material to be treated having a predetermined moisture content material and comprising a plurality of liquids having at least two different boiling points;
a dryer comprising an elongated housing having an inlet end and a discharge end, and the inlet end configured to receive a treated material for drying;
at least two screws provided within the housing and extending between the inlet end and the discharge end, the at least two screws configured to apply a compressive force to the treated material to assist with drying the treated material as the at least two screws rotate and move the treated material longitudinally along the at least two screws to produce a dried product;
a plurality of treatment zones disposed along the housing configured for treating the treated material moving along the at least two screws and configured for successively extracting a respective liquid, having a respective different boiling point, from the treated material in at least one zone of the plurality of treatment zones by creating a temperature and pressure within a selected treatment zone sufficient to target extraction of a selected liquid, without substantially extracting other liquids contained in the treated material, as the treated material travels successively through the plurality of treatment zones;
a collection assembly disposed along the housing and configured for selectively removing and collecting the selected liquid;
the collection assembly comprises:
at least a first venting zone and a second venting zone disposed along the housing;
the first venting zone, located substantially downstream of a first selected treatment zone, includes a first vacuum pipe, connected to at least one of one or more vacuum sources, for selectively removing only a first selected liquid, having a first boiling point, from the treated material moving along the at least two screws, within the first selected treatment zone, and collecting the first selected liquid in a first vessel; and
the second venting zone, located substantially downstream of a second treatment selected zone, includes a second vacuum pipe, connected to at least one of the one or more vacuum sources, for selectively removing only a second selected liquid, having a second boiling point different than the first boiling point of the first selected liquid, from the treated material moving along the at least two screws, within the second selected treatment zone, and collecting the second selected liquid in a second vessel; and
at least one drive coupled to each of the at least two screws for axially rotating the at least two screws.

2. The system of claim 1, further comprising a plurality of heating zones disposed along the housing at some of the plurality of treatment zones for heating the treated material moving along the at least two screws, wherein the plurality of heating zones is configured such that operating parameters and conditions for each heating zone are controlled independently of the other heating zones.

3. The system of claim 2, wherein at least one of the plurality of heating zones is configured to heat and maintain the treated material to a maximum temperature up to a boiling point of water to extract the water from the treated material, without substantially extracting the other liquids contained in the treated material.

4. The system of claim 3, wherein at least one of the other liquids comprises corn oil.

5. The system of claim 2, further comprising at least one of one or more venting zones interdisposed along the housing between the plurality of heating zones and sequentially advancing said treated material through the plurality of heating zones and at least one of the one or more venting zones.

6. The system of claim 5, wherein at least one of the one or more vacuum sources is a vacuum pump for venting gases from the housing and having a pump inlet connected to a manifold connected to at least one vent provided within at least one of the one or more venting zones.

7. The system of claim 1, wherein the treated material is fed into the inlet in controlled amounts to form a layer of treated material spread along the at least two screws.

8. The system of claim 1, wherein the at least two screws comprise an internal heating element for modifying a temperature of at least a portion of at least one screw of the at least two screws.

9. The system of claim 1, wherein said treated material is selected from the group consisting of a distiller wet grain, slurry, sludge and mixtures thereof.

10. The system of claim 1, wherein:
a control mechanism is connected to the dryer for controlling process variables and monitoring conditions of the system selected from the group consisting of residence time of the treated material in each treatment zone, amount of material fed into the inlet, the temperature of each treatment zone, the pressure in each treatment zone, temperature of at least one screw of the at least two screws, and the moisture content of the treated material at each treatment zone.

11. The system of claim 1, wherein:
a computer is connected to the dryer, said computer being programmed to control and regulate operating parameters selected from the group consisting of residence time of the treated material in each treatment zone, amount of material fed into the inlet, the temperature of each treatment zone, the pressure in each treatment zone, temperature of at least one screw of the at least two screws, and the moisture content of the treated material at each treatment zone.

12. The system of claim 10, wherein the control mechanism selectively controls and varies the process variables of the system based on the type of treated material.

13. The system of claim 11, wherein the computer selectively controls and varies the operating parameters of the system based on the type of treated material.

14. The system of claim 1, wherein the material is fed into the inlet having a moisture content of about 60% to 90% and dried to produce the dried product having a final moisture content of about 0% to 5%.

15. The system of claim 1, wherein the dried product comprises a dried grain for use as animal feed.

* * * * *